US012801861B2

(12) United States Patent
Xu et al.

(10) Patent No.: US 12,801,861 B2
(45) Date of Patent: Nov. 17, 2026

(54) DISTANCE-BASED LOGIT VALUES FOR NATURAL LANGUAGE PROCESSING

(71) Applicant: Oracle International Corporation, Redwood Shores, CA (US)

(72) Inventors: Ying Xu, Albion (AU); Poorya Zaremoodi, Melbourne (AU); Thanh Tien Vu, Brisbane (AU); Cong Duy Vu Hoang, Wantirna South (AU); Vladislav Blinov, Melbourne (AU); Yu-Heng Hong, Carlton (AU); Yakupitiyage Don Thanuja Samodhye Dharmasiri, Melbourne (AU); Vishal Vishnoi, Redwood City, CA (US); Elias Luqman Jalaluddin, Seattle, WA (US); Manish Parekh, San Jose, CA (US); Thanh Long Duong, Pointcook (AU); Mark Edward Johnson, Castle Cove (AU)

(73) Assignee: Oracle International Corporation, Redwood Shores (CA)

( * ) Notice: Subject to any disclaimer, the term of this patent is extended or adjusted under 35 U.S.C. 154(b) by 122 days.

(21) Appl. No.: 18/988,114

(22) Filed: Dec. 19, 2024

(65) Prior Publication Data

US 2025/0117591 A1 Apr. 10, 2025

Related U.S. Application Data

(63) Continuation of application No. 18/545,621, filed on Dec. 19, 2023, now Pat. No. 12,210,842, which is a (Continued)

(51) Int. Cl.

*G06F 40/35* (2020.01)
*G06N 20/00* (2019.01)

(Continued)

(52) U.S. Cl.

CPC ............ *G06F 40/35* (2020.01); *G06N 20/00* (2019.01); *H04L 51/02* (2013.01); *G06F 40/205* (2020.01); *G06F 40/253* (2020.01)

(58) Field of Classification Search

None

See application file for complete search history.

(56) References Cited

U.S. PATENT DOCUMENTS 10,685,293 B1 6/2020 Heimann et al.
10,796,217 B2 10/2020 Wu (Continued)

FOREIGN PATENT DOCUMENTS

CN 105393252 A 3/2016
CN 110458249 A 11/2019

(Continued)

OTHER PUBLICATIONS

Lee et al., A Simple Unified Framework for Detecting Out-of-Distribution Samples and Adversarial Attacks, 2018, 32nd Conference on Neural Information Processing Systems, pp. 1-11 (Year: 2018).*

(Continued)

*Primary Examiner* — Jakieda R Jackson

(74) *Attorney, Agent, or Firm* — Kilpatrick Townsend & Stockton LLP

(57) ABSTRACT

Techniques for using logit values for classifying utterances and messages input to chatbot systems in natural language processing. A method can include a chatbot system receiving an utterance generated by a user interacting with the chatbot system. The chatbot system can input the utterance into a machine-learning model including a set of binary classifiers. Each binary classifier of the set of binary classifiers can be associated with a modified logit function. The method can also include the machine-learning model using the modified (Continued)

logit function to generate a set of distance-based logit values for the utterance. The method can also include the machine-learning model applying an enhanced activation function to the set of distance-based logit values to generate a predicted output. The method can also include the chatbot system classifying, based on the predicted output, the utterance as being associated with the particular class.

20 Claims, 13 Drawing Sheets

Related U.S. Application Data continuation of application No. 17/456,916, filed on Nov. 30, 2021, now Pat. No. 12,019,994.

(60) Provisional application No. 63/119,459, filed on Nov. 30, 2020.

(51) Int. Cl.

| | |
|---|---|
| ***H04L 51/02*** | (2022.01) |
| *G06F 40/205* | (2020.01) |
| *G06F 40/253* | (2020.01) |

(56) References Cited

U.S. PATENT DOCUMENTS

| | | | |
|---|---|---|---|
| 10,825,449 | B1 | 11/2020 | Chinnalagu |
| 11,194,973 | B1 | 12/2021 | Goel et al. |
| 11,972,220 | B2 | 4/2024 | Xu et al. |
| 12,019,994 | B2 | 6/2024 | Xu et al. |
| 12,511,492 | B2 | 12/2025 | Xu et al. |
| 2015/0066479 | A1 | 3/2015 | Pasupalak et al. |
| 2016/0005395 | A1 | 1/2016 | Williams et al. |
| 2016/0253597 | A1 | 9/2016 | Bhatt et al. |
| 2018/0270261 | A1 | 9/2018 | Pande et al. |
| 2019/0167179 | A1 | 6/2019 | Arzy |
| 2019/0188590 | A1 | 6/2019 | Wu et al. |
| 2019/0205939 | A1 | 7/2019 | Lal et al. |
| 2019/0272323 | A1 | 9/2019 | Galitsky |
| 2019/0370695 | A1 | 12/2019 | Chandwani et al. |
| 2020/0019884 | A1 | 1/2020 | Mccourt |
| 2020/0057946 | A1 | 2/2020 | Singaraju et al. |
| 2020/0097496 | A1 | 3/2020 | Alexander et al. |
| 2020/0098366 | A1 | 3/2020 | Chakraborty |
| 2020/0218939 | A1 | 7/2020 | Mansour et al. |
| 2020/0285964 | A1 | 9/2020 | Cao et al. |
| 2020/0286463 | A1 | 9/2020 | Galitsky |
| 2020/0342850 | A1 | 10/2020 | Vishnoi et al. |
| 2020/0342874 | A1 | 10/2020 | Teserra et al. |
| 2020/0344185 | A1 | 10/2020 | Singaraju et al. |
| 2020/0372898 | A1 | 11/2020 | Olabiyi et al. |

FOREIGN PATENT DOCUMENTS

| | | | |
|---|---|---|---|
| CN | 110738239 | A | 1/2020 |
| CN | 111274374 | | 6/2020 |
| CN | 111598830 | A | 8/2020 |
| CN | 111615706 | A | 9/2020 |
| JP | 2017-076403 | | 4/2017 |
| JP | 2020140210 | A | 9/2020 |
| JP | 2020144905 | A | 9/2020 |
| JP | 2023532762 | A | 7/2023 |
| WO | 2018062227 | A1 | 4/2018 |
| WO | 2020/004136 | | 1/2020 |

OTHER PUBLICATIONS

CN202180080516.X, "Notice of Decision to Grant", Nov. 13, 2025, 6 pages.

JP2023-532762, "Notice of Decision to Grant", Mar. 10, 2026, 3 pages.

JP2023-532762, "Office Action", Dec. 9, 2025, 7 pages.

JP2023-532762, "Office Action", Jul. 1, 2025, 6 pages.

CN202180080516.X, "Office Action", Jun. 26, 2025, 5 pages.

U.S. Appl. No. 17/456,687, "Non-Final Office Action", Dec. 8, 2023, 8 pages.

U.S. Appl. No. 17/456,687, "Notice of Allowance", Feb. 27, 2024, 10 pages.

U.S. Appl. No. 17/456,687, "Notice of Allowance", Jan. 18, 2024, 10 pages.

U.S. Appl. No. 17/456,916, "Corrected Notice of Allowability", May 20, 2024, 2 pages.

U.S. Appl. No. 17/456,916, "Notice of Allowance", Nov. 16, 2023, 10 pages.

U.S. Appl. No. 18/545,621, "Notice of Allowance", Sep. 28, 2024, 12 pages.

Mozafari, et al., "Attended Temperature Scaling; A Practical Approach for Calibrating Deep Neural Networks", Cornell University Library, Oct. 27, 2018, pp. 1-10.

PCT/US2021/061062, "International Preliminary Report on Patentability", Jun. 15, 2023, 8 pages.

PCT/US2021/061062, "International Search Report and Written Opinion", Mar. 21, 2022, 11 pages.

PCT/US2021/061081, "International Preliminary Report on Patentability", Jun. 15, 2023, 7 pages.

PCT/US2021/061081, "International Search Report and Written Opinion", Mar. 22, 2022, 10 pages.

Peter Bruce and 2 others, Practical Statistics for Data Scientists, 2nd Edition, O'Reilly Japan, Inc. Tim O'Reilly, Nov. 6, 2020, p. 214-227.

Komei Sugiura and 3 others, Object Manipulation Dialogue by Estimating Utterance Understanding Probability in a Robot Language Acquisition Framework, Journal of the Robotics Society of Japan, Japan, The Robotics Society of Japan, Oct. 15, 2010, vol. 28, No. 8, p. 64-74.

JP 2025-130505, "Office Action", May 12, 2026, 3 pages.

* cited by examiner

DISTANCE-BASED LOGIT VALUES FOR NATURAL LANGUAGE PROCESSING

CROSS-REFERENCES TO RELATED APPLICATIONS

The present application is a continuation of U.S. application Ser. No. 18/545,621, filed Dec. 19, 2023, which is a continuation of U.S. application Ser. No. 17/456,916, filed Nov. 30, 2021, which claims the benefit of and priority to U.S. Provisional Application No. 63/119,459, filed on Nov. 30, 2020, each of which is incorporated herein by reference in its entirety and for all purposes.

TECHNICAL FIELD

The present disclosure relates generally to chatbot systems, and more particularly, to techniques for determining logit values for classifying utterances and messages input to chatbot systems in natural language processing.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

SUMMARY

Techniques are provided for classifying utterances and messages input to chatbot systems in natural language processing. A method can include a chatbot system receiving an utterance generated by a user interacting with the chatbot system. The chatbot system can input the utterance into a machine-learning model including a set of binary classifiers. Each binary classifier of the set of binary classifiers: (i) can be configured to estimate a probability that the utterance corresponds to a class of the set of classes; (ii) can be associated with a modified logit function that transforms the probability for the class into a real number. The modified logit function can be a logarithm of odds corresponding to the probability for the class, the logarithm of odds being determined based on a distance measured between the probability for the class and a centroid of a distribution associated with the class.

The method can also include the machine-learning model generating a set of distance-based logit values for the utterance. In some instances, each distance-based logit value of the set of distance-based logit values is generated by: (i) determining, by a respective binary classifier of the set of binary classifiers, a respective probability that the utterance corresponds to a class associated with the respective binary classifier; and (ii) mapping, by the respective binary classifier and based on the modified logit function, the respective probability to the distance-based logit value. The mapping can include using a respective distance measured between the respective probability and a centroid of a distribution associated with the class associated with the respective binary classifier.

The method can also include the machine-learning model applying an enhanced activation function to the set of distance-based logit values to generate a predicted output. The predicted output can identify a normalized probability predictive of whether the utterance corresponds to a particular class of the set of classes within a probability distribution. The enhanced activation function can include a learned parameter for normalizing an initial output of the enhanced activation function to determine the normalized probability.

The method can also include the chatbot system classifying, based on the predicted output, the utterance as being associated with the particular class.

Techniques are also provided for training a machine-learning model that uses distance-based logit values for classifying utterances and messages. A method can include a training subsystem receiving a training dataset. The training dataset can include a plurality of utterances generated by users interacting with a chatbot system. The training subsystem can access a machine-learning model including a set of binary classifiers. Each binary classifier of the set of binary classifiers: (i) can be configured to estimate a probability that the utterance corresponds to a class of the set of classes; (ii) can be associated with a modified logit function that transforms the probability for the class into a real number. In some instances, the modified logit function is a logarithm of odds corresponding to the probability for the class, the logarithm of odds being determined based on a distance measured between the probability for the class and a centroid of a distribution associated with the class.

The method can also include the training subsystem training the set of binary classifiers of the machine-learning model with the training dataset. The training can include, for each binary classifier of the set of binary classifiers determining a respective probability that an utterance of the training dataset corresponds to a class associated with the binary classifier. The training can also include mapping, based on the modified logit function, the respective probability for the class associated with the binary classifier to a distance-based logit value. The mapping can include using a respective distance measured between the respective probability and a centroid of a distribution associated with the class associated with the binary classifier.

The training can also include applying an enhanced activation function to the distance-based logit value to generate a predicted output for the class. The predicted output can identify a normalized probability predictive of whether the utterance corresponds to the class within a probability distribution. The enhanced activation function can include a learned parameter for normalizing an initial output of the enhanced activation function to determine the normalized probability. The training can also include applying an enhanced loss function to the predicted output and an expected output of the utterance to determine a total loss. The enhanced loss function can include a set of loss terms for determining the total loss, in which the set of loss terms include: (i) a binary cross-entropy loss term; (ii) a mean-square error term; (iii) a margin loss term; and (iv) a threshold loss term. The training can also include adjusting one or more parameters of the binary classifier, in which the one or more parameters include the learned parameter of the enhanced activation function.

Once the training of the machine-learning model has been performed, the method can also include the training subsystem deploying the trained machine-learning model.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
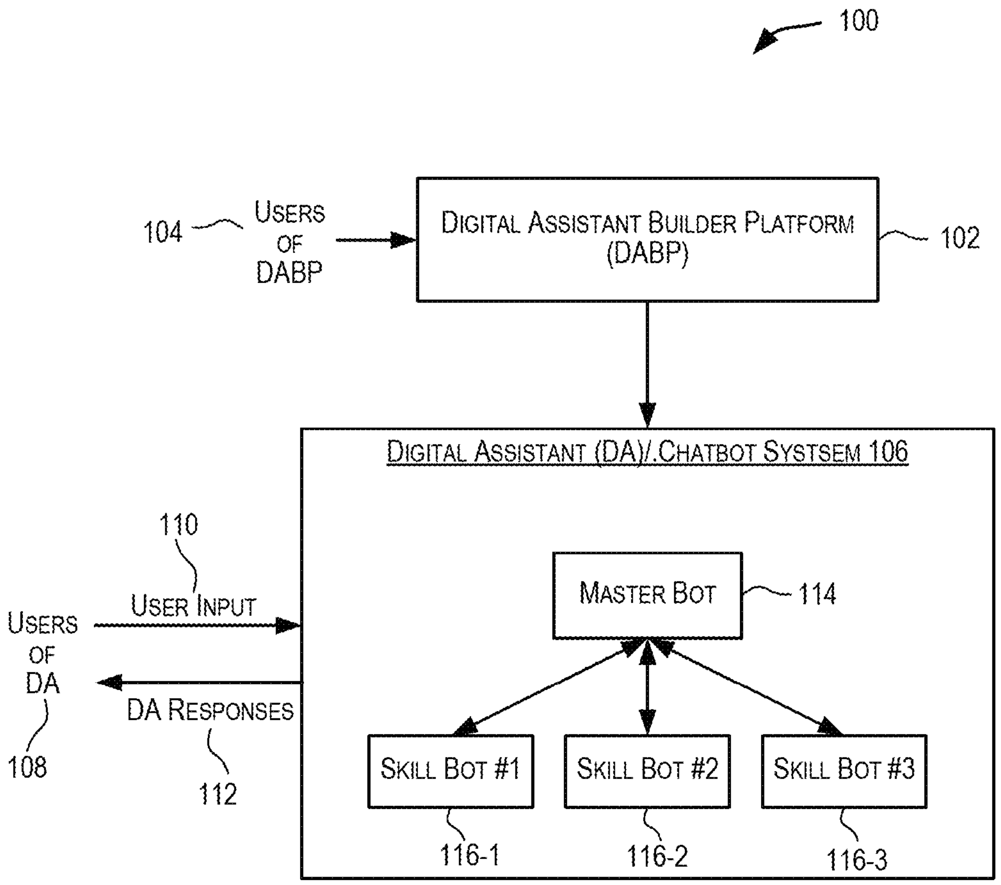
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A. Overview

1. Intents

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

While the examples described herein focus on intent prediction, it is to be understood that other classification tasks may be similarly treated. For example, a chatbot system may include classifiers to address utterances at other levels, such as skill bot invocation.

However, building a chatbot that can determine the end users' intents based upon user utterances, is a challenging task in part due to the subtleties and ambiguity of natural languages and the dimension of the input space (e.g., possible user utterances) and the size of the output space (number of intents). An illustrative example of this difficulty arises from characteristics of natural language, such as employing euphemisms, synonyms, or ungrammatical speech to express intent. For example, an utterance may express an intent to order a pizza without explicitly mentioning pizza, ordering, or delivery explicitly. For example, in certain regional vernaculars, "pizza" is referred to as "pie." These tendencies in natural language, such as imprecision or variability, give rise to uncertainty and introduce confidence as a parameter for prediction of intent, as opposed to explicit indication of intent, for example, through inclusion of keywords. As such, the chatbot may need to be trained, monitored, debugged, and retrained in order to improve the performance of the chatbot and user experience with the chatbot. In conventional systems, training systems are provided for training and retraining machine-learning models of the digital assistant or chatbot in spoken language understanding (SLU) and natural language processing (NLP).

2. Determining Intents Using Machine-Learning Models

At one or more points, chatbot systems may provide utterances as inputs to neural network models that use a logistic regression function to map outputs to a probability distribution. For classification, for example, ordering a set of outputs in a probability distribution permits the prediction of an intent invoked in an utterance. Accurate predictions, in turn, permit chatbots to accurately interact with end users. Accuracy, in this sense, depends at least in part on mapping outputs of a neural network classifier to a probability distribution.

To map the outputs of a neural-network machine-learning model into the probability distribution, logit values are determined based on the inputs. Logit values, also referred to as "logits," are values outputted by logit functions of a network layer of a machine-learning model. The logit value can represent odds that the utterance corresponds to a particular class. The logit function is a logarithm of odds for a particular class (e.g., order_pizza intent class, unresolvable class) and transforms an output of the machine-learning model into a corresponding logit value that fits within a probability distribution. The probability distribution ranges between $(-\infty, +\infty)$.

The logit value can then be provided as input to an activation function (e.g., a softmax function) to generate a predicted likelihood of whether an input (e.g., an utterance) corresponds to the particular class of a set of classes. In the context of intent classification, the input can be weighted outputs of a neural network model. For example, a numerical output corresponding to a particular class (e.g., order_pizza) is generated by processing an input utterance (e.g., "I want to grab a pie") through one or more intermediate layers of a multinomial machine-learning model. The output can be processed by a logit function of the particular class to generate a logit value of 9.4. The activation function can then be applied to the logit value to determine a probability value ranging between 0 and 1 (e.g., 0.974), which indicates that the input utterance corresponds to the order_pizza class. An utterance that invokes any intent other than an intent the classifier can also trained to identify will correspond to an out of scope or out of domain utterance. For example, an utterance "how is the weather today?" can be considered out-of-scope for a classifier that is trained to predict whether the utterance specifies an order for a particular food item.

Classification accuracy can be further enhanced by weighting one or more parameters of the logit functions. For example, each intent class may be associated with a logit function that may be weighted by a centroid of the intent class. As used herein, the term "centroid" refers to a location of the central position of a cluster used for classifying utterances, in which the cluster identifies data corresponding to a particular end user intent class. In some instances, the centroid is determined using data from a corresponding dataset of utterances (e.g., a training dataset). Weighting a logit function by a centroid of a distribution permits the logit function to more accurately predict a classification for a given utterance, especially when the utterance is in-domain or in-scope (e.g., utterances that the system has been trained to recognize).

3. Overconfidence Problem Associated with Machine-Learning Models

Deep neural networks suffer from the problem of overconfidence (of the confidence score), where the confidence score generated by the neural network for a class may become de-correlated from the real confidence score. A deep neural network model may even produce highly confident wrong classification predictions when the actual inputs are not well represented by the training data that was used to train the neural network model, i.e., actual samples are drawn from outside the distribution observed during training. Accordingly, while deep neural networks are desirable for use because of their increased accuracy, the overconfidence problem associated with deep neural network has to be dealt with to avoid performance issues for the neural network.

Conventional techniques using the softmax function do not effectively address the above overconfidence problem. In some instances, the softmax function perpetuates the overconfidence problem, by failing to consider individual strengths of the output signals of the neural network model. Instead, the softmax function considers the output signal in comparison to each other, which can result in overestimating the confidence for a prediction. This can be especially true for logit values where only one element is positive. As an illustrative example, consider the logit values for 3-way classification for a first utterance as [10, 3, 1] and a second utterance as [3, −2, −4]. In the second utterance, only one of the three classes is positive (e.g., 3), indicating that the model is not as confident about the predictions relative to the prediction of the first utterance (e.g., 10). After softmax normalization, however, a confidence score for the positive output is amplified, resulting in confidence scores for both utterances close to 100%. In this way, softmax normalization overestimates model confidence in predictions and affect prediction accuracy.

Other conventional techniques have been attempted to address the overconfidence problem. For example, an n-binary classifier for n-classes has been implemented as an alternative to an n-multiclass classifier. The n-binary classifier implements "n" classifiers that classify an input utterance either "in" or "out" for each intent class. In this way, the n-binary approach corresponds to a "one-versus-all" classification, as opposed to a "one-among-many" approach. In addition, rather than calculating a categorical cross-entropy loss as in the softmax approach, the n-binary approach calculates a binary cross-entropy loss for each class. For example, the n-binary classifier can use a sigmoid function as the output activation function, instead of the softmax function.

While the use of n-binary classifier may address the limitation of softmax normalization with respect to the strength of individual model output signals, n-binary classifiers may present their own drawbacks. For example, the accuracy may be lower for an n-binary classifier than for the softmax approach. In addition, the n-binary classifier may fail to satisfy a threshold confidence margin to predict a single class. For example, a minimum confidence margin of 10% may be imposed to classify an utterance between most probable and second most probable predictions. Since the softmax function distributes all classes in a probability distribution that sums to 100%, if the top prediction confidence score is >=55% the second-best prediction will be <=45% and will therefore satisfy the minimum 10% margin. However, with the n-binary classifier approach, a confidence score for each class is determined independently and is defined to sum to 100%. The importance of confidence margin is emphasized, for example, in utterances that include multiple different intents. As such, it may be more likely for the confidence margin to be unsatisfied and the utterance to be misclassified as unresolved, out of domain, or out of scope.

Accordingly, it is challenging for a machine-learning model to accurately determine its confidence when it predicts a particular class for a given utterance. This may lead to misinterpretation of classification outputs, in the event of an occurrence of overconfidence.

4. Distance-Based Logit Values for Classifying Utterances as Having Unresolved Intent To overcome the above deficiencies, the present techniques include a system and method for using distance-based logits in machine-learning models to accurately estimate a probability that the utterance corresponds to a particular class. The method includes receiving one or more utterances or messages by an intent classifier of a chatbot system. The method includes determining, by the chatbot system, an intent for the one or more utterances or messages, using a set of binary classifiers (e.g., an n-binary classifier). Each binary classifier of the a set of binary classifiers includes a modified logit function for outputting a corresponding distance-based logit value. For example, the distance-based logit value may be calculated by using the modified logit function for a given class "$C_i$", in which the modified logit function includes determining the distance between a centroid for that class "$W_i$" and an intermediate output of a corresponding binary classifier "f(x)." In some instances, the distance between a centroid and an output vector is measured by different distance metrics, such as Euclidean distance, cosine distance, etc.

In some instances, the accuracy of the probability estimation is further improved by implementing an enhanced activation function. The enhanced activation function includes scaling the distance-based logit using a scaling value. The scaling value can be a fixed value or a learned parameter of the intent classifier, in which a fixed value can be determined through hyper-parameter tuning while a value of the parameter is learned during model training. Additionally or alternatively, the machine-learning model may include an enhanced loss function that incorporates a number of additional loss terms to improve the accuracy of probability estimation of a given utterance. The loss terms of the enhanced loss function can include one or more of: (i) a binary cross-entropy loss term; (ii) a mean-square error term; (iii) a margin loss term; and (iv) a threshold loss term. In some instances, each term of the loss function is weighted by a respective weighting factor. The weighting factors can be tuned as part of hyperaparametric tuning of the intent classifier.

Such incorporation of the distance-based logit values can thus facilitate the intent classifier to improve its accuracy in predicting a probability of whether the utterance corresponds to a particular intent class. In addition, the distance-based logit values can normalize the outputs of the n-binary classifier, thereby reducing overconfidence problems that can be encountered by conventional softmax-function based techniques. The distance-based logit values can also be an improvement over conventional n-binary "one-versus-all" classifiers, as the distance-based logit values can allow the machine-learning model provide a prediction of the intent in the one or more utterances above a threshold confidence and with a minimum margin between the most confident intent and the second most confident intent.

B. Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some instances, the interaction may include the end user saying "Hello" to the bot and the bot responding with a "Hi" and asking the end user how it can help. In some instances, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

In some instances, an utterance is analyzed to determine whether the utterance contains an invocation name of a skill bot. If no invocation name is found, then the utterance is deemed to be non-explicitly invoking and the process proceeds with an intent classifier such as the trained model. If it is determined that there is an invocation name, then the utterance is deemed to be an explicit invocation and the process proceeds to determine which parts of the utterance are associated with the invocation name. In the instance the trained model is invoked, the entire utterance that was received is provided as input to an intent classifier.

Figure 2:
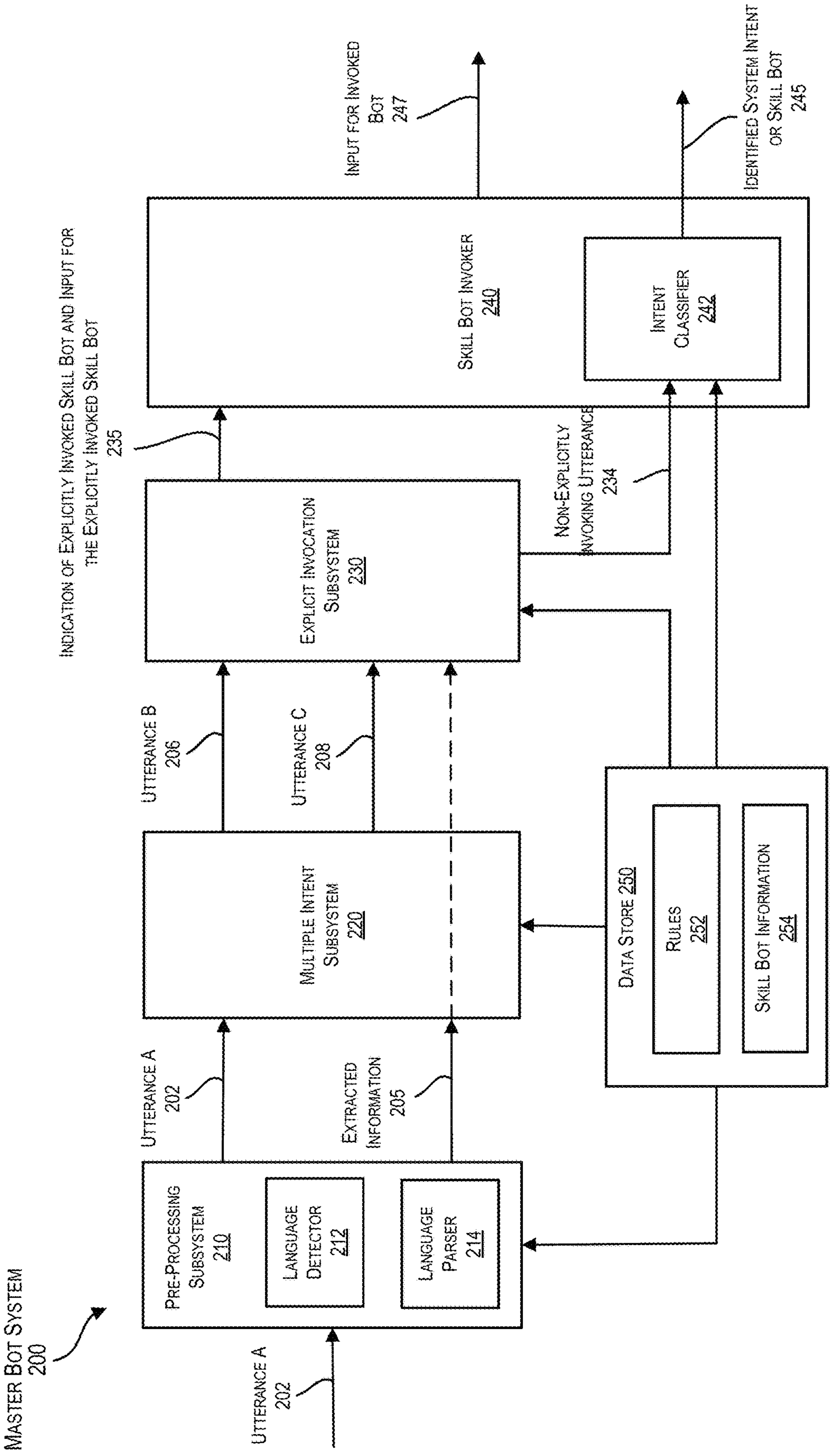
FIG. 2 is a simplified block diagram of a computing system implementing a master bot according to certain embodiments.

The intent classifier that receives the utterance in can be an intent classifier of a master bot (e.g., intent classifier 242 in FIG. 2). The intent classifier can be a machine-learning-based or rules-based classifier that was trained determine whether the intent of the utterance matches to a system intent (e.g., exit, help) or to a particular skill bot. As explained herein, intent analysis performed by a master bot may be limited to matching to a particular skill bot without determining which intent within the particular skill bot is the best match for the utterance. Thus, the intent classifier that receives the utterance may identify a particular skill bot to be invoked. Alternatively, if the utterance represents a particular system intent (e.g., the utterance contains the words "exit" or "help"), then the intent classifier that receives the utterance may identify the particular system intent to trigger a conversation between the master bot and the user based on a dialog flow configured for this particular system intent.

The intent classifier may use a binary cross-entropy loss function and a distance-based logit value as part of predicting the intent of the utterance. In this way, the distance refers to a distance calculated between the output vector of the intent classifier and a centroid for a particular intent. The logit values for the different intents thereafter serve as inputs to the loss functions included in the overall loss function of the model. For example, the overall loss function may include the binary cross-entropy loss term, a margin loss term, and a threshold loss term. In this way, the intent classifier may predict an intent when the most probable intent satisfies a minimum difference between the most probable and the second most probable intents, and when the most probable intent meets a minimum threshold confidence, related to a distance measurement from the centroids of the intents.

In the instance that there is an invocation name, one or more explicit invocation rules are applied to determine which parts of the utterance are associated with the invocation name. The determination can be based on analysis of the sentence structure of the utterance using POS tags, dependency information, and/or other extracted information received with the utterance. For instance, a part associated with the invocation name can be a noun phrase including the invocation name or a prepositional object corresponding to the invocation name. Any parts associated with the invocation name, as determined based on the processing, are removed. Other parts of the utterance that are not needed for conveying the meaning of the utterance (e.g., a preposition word) can also be removed. The removal of certain parts of the utterance produces input for the skill bot associated with the invocation name. If there are any parts of the utterance received that remain after the removal, the remaining parts form a new utterance for input to the skill bot, e.g., as a text string. Otherwise, if the utterance received is completely removed, then the input may be an empty string. Thereafter, the skill bot associated with the invocation name is invoked and the skill bot is provided with the input produced.

Upon receiving the input produced, the invoked skill bot will handle the input, for example, by performing intent analysis using an intent classifier of the skill bot that was trained to identify a bot intent matching the user intent represented in the input. Identification of the matching bot intent may result in the skill bot performing a particular action or starting a conversation with the user in accordance with a dialog flow associated with the matching bot intent. For instance, if the input is an empty string, a conversation could be started in a default state defined for the dialog flow, e.g., a welcome message. Alternatively, if the input is not an empty string, then the conversation could be started in some intermediate state, e.g., because the input contains a value for an entity or some other information that the skill bot no longer needs to ask the user for by virtue of having received this information as part of the input. As another example, the skill bot may decide that it cannot handle the input (e.g., because the confidence scores of every bot intent configured for the skill bot are below a certain threshold). In this situation, the skill bot may refer the input back to the master bot for handling (e.g., intent analysis using the intent classifier of the master bot), or the skill bot may prompt the user for clarification.

1. Overall Environment

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section 5 a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user May want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

2. Components of a Master Bot System

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
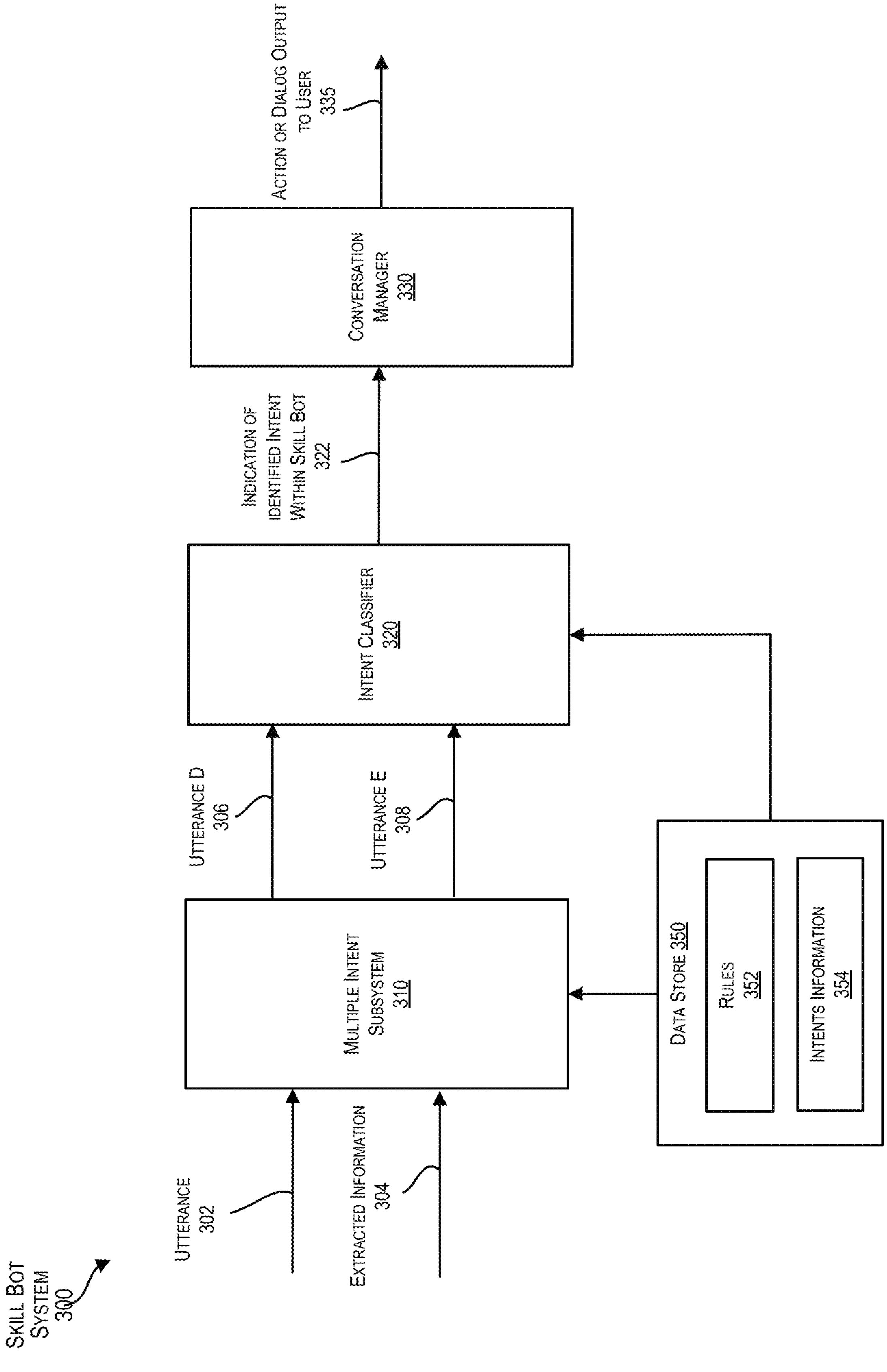
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

3. Components of a Skill Bot System

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

4. Scheme for Using Trained Intent Classifiers to Classify Utterances

Figure 4:
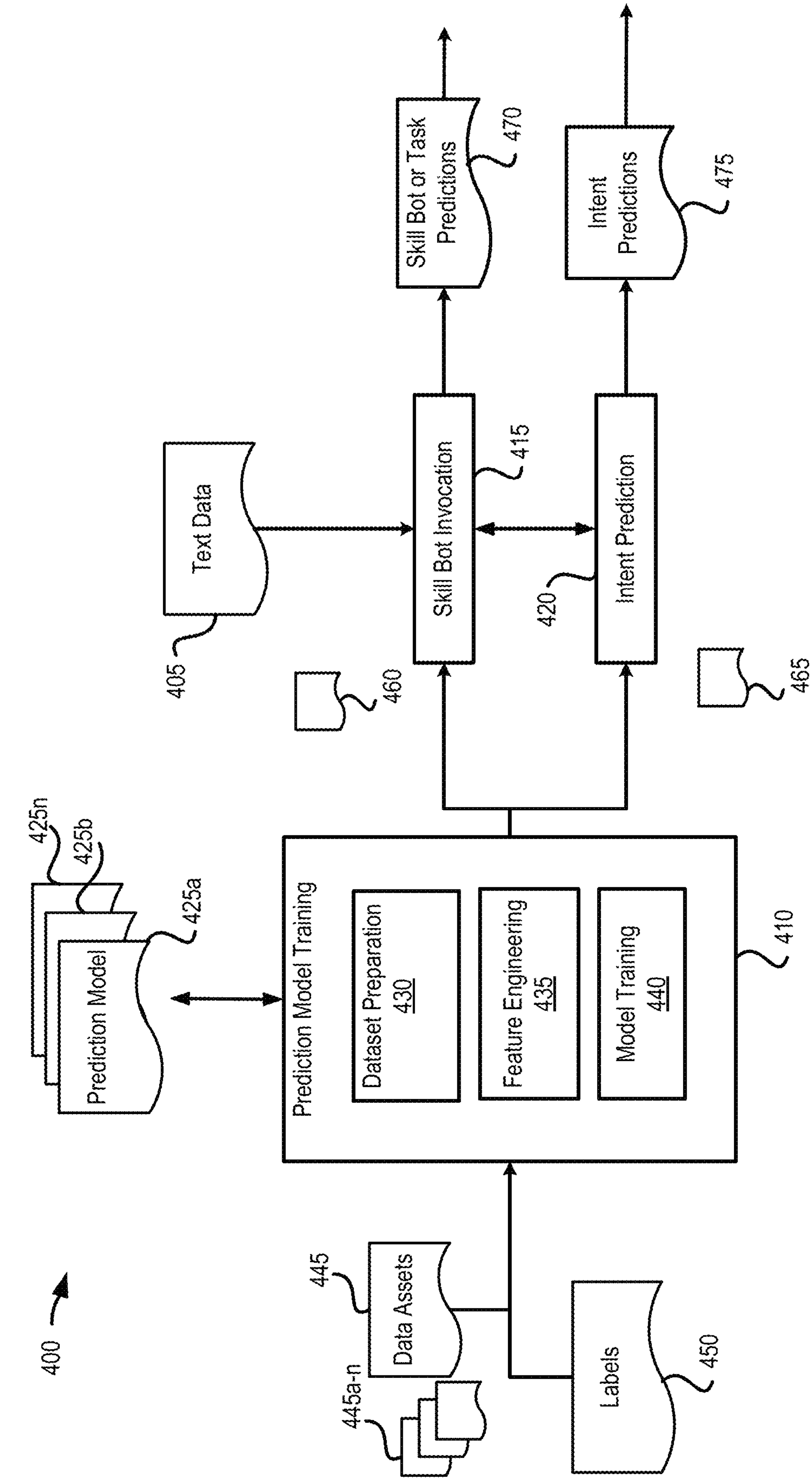
FIG. 4 is a simplified block diagram of a chatbot training and deployment system in accordance with various embodiments.

FIG. 4 shows a block diagram illustrating aspects of a chatbot system 400 configured to train and utilize classifiers (e.g., the intent classifier 242 or 320 described with respect to FIGS. 2 and 3) based on text data 405. As shown in FIG. 4, the text classification performed by the chatbot system 400 in this example includes various stages: a prediction model training stage 410, a skill bot invocation stage 415 to determine a likelihood that an utterance is representative of a task that a particular skill bot is configured to perform, and an intent prediction stage 420 for classifying utterances as one or more intents. The prediction model training stage 410 builds and trains one or more prediction models 425*a*-425*n* ('n' represents any natural number) to be used by the other stages (which may be referred to herein individually as a prediction model 425 or collectively as the prediction models 425). For example, the prediction models 425 can include a model for determining a likelihood that an utterance is representative of a task that a particular skill bot is configured to perform, another model for predicting an intent from an utterance for a first type of skill bot, and another model for predicting an intent from an utterance for a second type of skill bot. Still other types of prediction models may be implemented in other examples according to this disclosure.

A prediction model 425 can be a machine-learning ("ML") model, such as a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A prediction model 425 can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The chatbot system 400 may employ the same type of prediction model or different types of prediction models for determining a likelihood of a task that a particular skill bot is configured to perform, predicting an intent from an utterance for a first type of skill bot, and predicting an intent from an utterance for a second type of skill bot. Still other types of prediction models may be implemented in other examples according to this disclosure.

To train the various prediction models 425, the training stage 410 is comprised of three main components: dataset preparation 430, feature engineering 435, and model training 440. The dataset preparation 430 includes the process of loading data assets 445, splitting the data assets 445 into training and validation sets 445 a-n so that the system can train and test the prediction models 425, and performing basic pre-processing. The data assets 445 may include at least a subset of utterances from example utterances associated with various skill bots. As indicated above, an utterance can be provided in various ways including audio or text. The utterance can be a sentence fragment, a complete sentence, multiple sentences, and the like. For example, if the utterance is provided as audio, the data preparation 430 may convert the audio to text using a speech-to-text converter (not shown) that inserts punctuation marks into the resulting text, e.g., commas, semicolons, periods, etc. In some instances, the example utterances are provided by a client or customer. In other instances, the example utterances are automatically generated from prior libraries of utterances (e.g., identifying utterances from a library that are specific to a skill that a chatbot is to learn). The data assets 445 for a prediction model 425 can include input text or audio (or input features of text or audio frames) and labels 450 corresponding to the input text or audio (or input features) as a matrix or table of values. For example, for each training utterance, an indication of the correct bot to use for the training utterance may be provided as ground truth information for labels 450. The behavior of the prediction model 425 can then be adapted (e.g., through back-propagation) to minimize the difference between the generated inferences and the ground truth information. Alternatively, a prediction model 425 may be trained for a particular skill bot, using at least a subset of example utterances associated with that particular skill bot as training utterances. The ground truth information for labels 450 for each training utterance would be the particular bot intent associated with the training utterance.

In some embodiments, the feature engineering 435 includes transforming the data assets 445 into feature vectors and/or creating new features using the data assets 445. The feature vectors may include count vectors as features, term frequency-inverse document frequency (TF-IDF) vectors as features such as word level, n-gram level or character level, word embedding as features, text/NLP as features, topic models as features, or an combination thereof. Count vector is a matrix notation of the data assets 445 in which every row represents a utterance, every column represents a term from the utterance, and every cell represents the frequency count of a particular term in a utterance. TF-IDF score represents the relative importance of a term in the utterance. A word embedding is a form of representing words and utterances using a dense vector representation. The position of a word within the vector space is learned from text and is based on the words that surround the word when it is used. Text/NLP based features may include word count in the utterance, character count in the utterance, average word density, punctuation count, upper case count, title word count, frequency distribution of part of speech tags (e.g., nouns and verbs), or any combination thereof. Topic modelling is a technique to identify the groups of words (called a topic) from a collection of utterances that contains best information in the collection.

In some embodiments, the model training 440 includes training a classifier using the feature vectors and/or new features created in the feature engineering 435. In some instances, the training process includes iterative operations to find a set of parameters for the prediction model 425 that minimizes a loss or error function for the prediction models 425. Each iteration can involve finding a set of parameters for the prediction model 425 so that the value of the loss or error function using the set of parameters is smaller than the value of the loss or error function using another set of parameters in a previous iteration. The loss or error function can be constructed to measure the difference between the outputs predicted using the prediction models 425 and the labels 450 contained in the data assets 445. Once the set of parameters are identified, the prediction model 425 has been trained and can be utilized for prediction as designed.

In addition to the data assets 445, labels 450, the feature vectors and/or new features, other techniques and information can also be employed to refine the training process of the prediction models 425. For example, the feature vectors and/or new features may be combined together to help to improve the accuracy of the classifier or model. Additionally or alternatively, the hyperparameters may be tuned or optimized, for example, a number of parameters such as tree length, leafs, network parameters etc. can be fine-tuned to get a best fit model. Although the training mechanisms described herein mainly focus on training a prediction model 425. These training mechanisms can also be utilized to fine tune existing prediction models 425 trained from other data assets. For example, in some cases, a prediction model 425 might have been pre-trained using utterance specific to another skill bot. In those cases, the prediction models 425 can be retrained using the data assets 445 as discussed herein.

The prediction model training stage 410 outputs trained prediction models 425 including the task prediction models 460 and intent prediction models 465. The task prediction models 460 may be used in the skill bot invocation stage 415 to determine a likelihood that an utterance is representative of a task that a particular skill bot is configured to perform 470, and the intent prediction models 465 may be used in the intent prediction stage 420 for classifying utterances as one or more intents 475. In some instances, the skill bot invocation stage 415 and the intent prediction stage 420 may proceed independently in some examples with separate models. For example, trained intent prediction models 465 may be used in the intent prediction stage 420 to predict intents for skill bots without first identifying the skill bots in the skill bot invocation stage 415. Similarly, the task prediction models 460 may be used in the skill bot invocation stage 415 to predict tasks or skill bots to be used for utterances without identifying the intent of the utterances in the intent prediction stage 420.

Alternatively, the skill bot invocation stage 415 and the intent prediction stage 420 may be conducted sequentially with one stage using the outputs of the other as inputs or one stage being invokes in a particular manner for a specific skill bot based on the outputs of the other. For instance, for a given text data 405, a skill bot invoker can invoke a skill bot through implicit invocation using the skill bot invocation stage 415 and the task prediction models 460. The task prediction models 460 can be trained, using machine-learning and/or rules-based training techniques, to determine a likelihood that an utterance is representative of a task that a particular skill bot 470 is configured to perform. Then for an identified or invoked skill bot and a given text data 405, the intent prediction stage 420 and intent prediction models 465 can be used to match a received utterance (e.g., utterance within given data asset 445) to an intent 475 associated with skill bot. As explained herein, a skill bot can be configured with one or more intents, each intent including at least one example utterance that is associated with the intent and used for training a classifier. In some embodiments, the skill bot invocation stage 415 and the task prediction models 460 used in the master bot system are trained to determine confidence scores for individual skill bots and confidence scores for system intents. Similarly, the intent prediction stage 420 and intent prediction models 465 can be trained to determine a confidence score for each intent associated with the skill bot system. Whereas the classification performed by the skill bot invocation stage 415 and the task prediction models 460 is at the bot level, the classification performed by the intent prediction stage 420 and intent prediction models 465 is at the intent level and therefore finer grained.

C. Logit Functions

Figure 5:
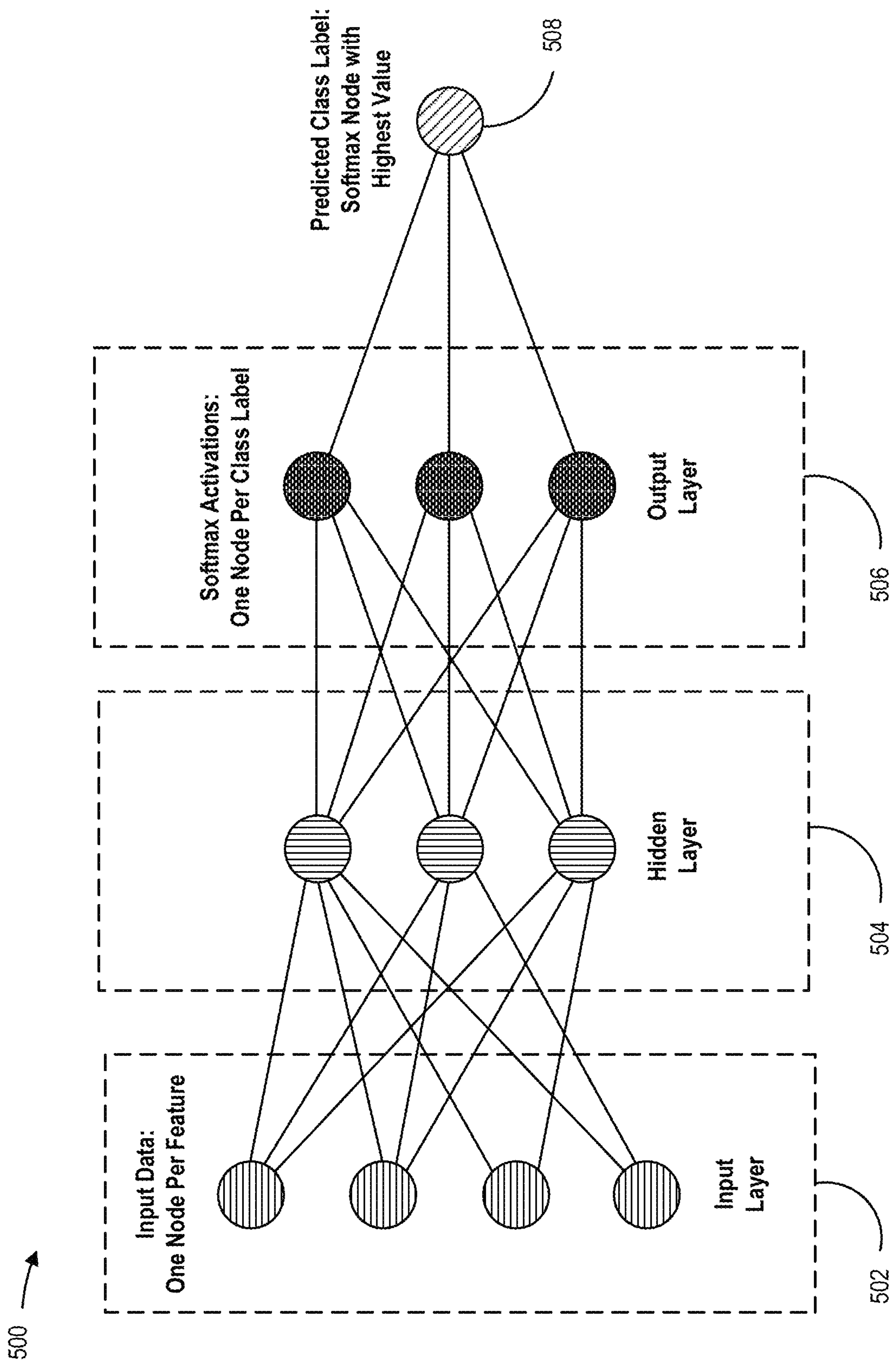
FIG. 5 illustrates an schematic diagram of an example neural network, according to some embodiments.

FIG. 5 illustrates an schematic diagram of an example neural network 500, according to some embodiments. The neural network 500 can be a machine-learning model trained by a training system and implemented by a chatbot system, in which the machine-learning model is trained to predict whether an utterance corresponds to a particular intent class. In some instances, the neural network 500 includes an input layer 502, a hidden layer 504, and an output layer 506. In some instances, the neural network 500 includes multiple hidden layers, at which the hidden layer 504 corresponds to a final hidden layer of the neural network.

The input layer 502 can receive input data or a representation of the input data (e.g., an n-dimensional array of values that represent an utterance) and apply one or more learned parameters to the input data to generate a set of outputs (e.g., a set of numerical values). The set of outputs can be processed by the hidden layer 504.

The hidden layer 504 can include one or more learned parameters that transform the set of outputs to a different feature space where the input data points from different classes are better separated.

The output layer 506 can include an classification layer that maps the output from hidden layers to logit values where each value correspond to one particular class (e.g., a resolvable class, an unresolvable class). In some instances, the output layer 506 includes an activation function for constraining the logit values into a set of probability values that sum up to 1. Thus, the logit values generated by the classification layer (logit function) for each class can then be processed by an activation function of the output layer (also referred herein as an "activation layer") to predict a classification for the utterance.

As part of predicting a single intent from a set of output values, machine-learning models may employ a logit function (short for "logistic regression function") in a network layer of the neural network 500. The output layer 506 can include a logit function for transforming the intermediate output (e.g., a probability value predictive of whether the utterance corresponds to a particular class) into a logit value. in some instances, the logit function is a logarithm of odds that, for a particular class, receives an input corresponding to a probability value between zero and one and outputs a logit value within an unbounded range between negative infinity to positive infinity. The logit function can be used to normalize each intermediate output of the set of intermediate outputs, such that the resulting set of logit values can be expressed into a symmetrical, unimodal probability distribution over predicted output classes. In mathematical terms, the logit function is defined as $$logit = \log\left(\frac{p}{1-p}\right),$$

where p is the probability of an input corresponding to a particular class. The probability p can be set within a range between (0,1). The output logit can correspond to a logit value that ranges between (−∞, +∞). In this way, machine-learning models may employ the logit function such that the ensuing activation function can predict the most probable output (e.g., intent) from other less probable outputs of a classifier.

As part of training a machine-learning model (e.g., intent classifier 320 of FIG. 3), the machine-learning model may learn a centroid for each class, in which the centroid is part of the logit function. For an identified set of intents that the intent classifier has been trained to recognize, the centroid plays a role in classifying an utterance as belonging to one particular intent over others, for example, by using the centroid as a position for measuring distances between neighboring clusters and between a cluster and a model output.

Centroids can be employed to weight the logit function, for example, to be used as part of filtering classifier outputs to isolate a probable intent from an utterance. In mathematical terms, an equation relating the logit function may be: $logit_i = f(x)*W_i$, where x is an input to a model, f(x) is a set of transformations (e.g., a highway network function), and $W_i$ is a centroid for intent "i," serving as a weighting factor of the model output for that intent. Thus, for an identified set of intents that the intent classifier has been trained to recognize, the centroid plays a role in classifying an utterance as belonging to one particular intent over others, for example, by using the centroid as a position for measuring distances between neighboring clusters.

The logit value generated for each of the predicted output classes can then be processed by an activation function to map the odds represented by the logit value into a probability distribution over all predicted output classes. As one example of the activation function, a softmax function may be used to normalize the output of a network (e.g., the logit values corresponding to order_pizza class) to a probability distribution over all predicted output classes (e.g., order_pizza, unresolved intent).

Prior to applying softmax, the logit values could be negative, or greater than one; and might not sum to 1. Applying softmax, each output will be in the interval (0, 1), and the outputs will add up to 1. Furthermore, the larger input logit values will correspond to larger probabilities. In function terminology, the softmax function is represented by:

$$\sigma(z_i) = \frac{e^{z_i}}{\sum_{j=1}^{K} e^{z_j}},$$

for i=1: K and z is a set of K real numbers ($z_1$: $z_K$). In some instances, the softmax function may be weighted by a base factor b, which creates a probability distribution that is more concentrated around the positions of the largest input values. In such cases, the softmax function is $$\sigma(z_i) = \frac{e^{\beta z_i}}{\sum_{j=1}^{K} e^{z_j}},$$

where β is a real number. In the context of intent classification, $z_i$ may be set to $f(x)*w_i$.

D. Techniques for Distance-Based Logit Determination for Utterance Classifications However, the denominator of the softmax function indicates that the value of the softmax function for real number "i" is a function of the exponentials of all other classes that the machine-learning model is trained to differentiate. Softmax normalization can thus be less sensitive to the strength of an individual that is output by a classifier model. In addition, softmax may overestimate confidence values, especially when some of the model outputs are negative.

As an illustrative example, logit values for a given 3-way classification of 2 utterances are [10, 3, 1] and [3, −2, −4]. In the second utterance, the model is not as confident about the predictions as in the first utterance, as reflected in the lower overall logit values and the inclusion of negative logit values, but after normalization using the softmax function, the confidence scores for both utterances are close to 100%. Since the nominal value of a logit should correspond to the confidence of the model in the respective class (e.g., larger logit values should correspond to higher probability), in this example, the softmax function introduces overconfidence and inaccuracy on the part of the classifier.

As part of addressing the drawbacks of the n-binary classifier approach, a distance-based logit value can be generated to predict whether an utterance corresponds to a particular class. The distance-based logit value corresponding to a probability of an intent class can be determined by measuring, for a given class "i", a distance (e.g., a Euclidean distance) between an intermediate output "f(x)" generated by a final layer of the machine-learning model and a centroid $w_i$.

For example, a machine-learning model can be configured to generate a set of outputs, in which each output of the set includes a probability predictive of whether the utterance corresponds to a respective class of the set of classes. The machine-learning model can include a set of binary classifiers. Each binary classifier of the set can generate an intermediate output that represents whether the utterance corresponds to a particular class over other classes of the set of classes. The intermediate output can be applied to a modified logit function to generate a distance-based logit value for the particular class. The distance-based logit value can represent odds that the utterance corresponds to a particular class, in which the odds for the particular class are normalized based on a distance between the intermediate output of a binary classifier and a centroid of the particular class. The logit function can be a logarithm of odds for a particular class (e.g., order_pizza intent class, cancel_pizza intent class) and transforms the intermediate output into a corresponding logit value that fits within a probability distribution. The logit value distribution can range between (−∞, +∞). The logit value can be processed through an activation function to generate the probability value that ranges between [0, 1] for the particular class.

In some instances, the accuracy of the probability is further improved by implementing an enhanced activation function. The enhanced activation function includes scaling the distance-based logit using a scaling value. The scaling value can be fixed value which is determined during hyper-parameter tuning. Alternatively, the scaling value can be a learned parameter of the intent classifier, in which a value of the parameter is learned during model training. Additionally or alternatively, the machine-learning model may incorporate use an enhanced loss function to improve the accuracy of probability estimation of a given utterance. The loss terms of the enhanced loss function can include one or more of: (i) a binary cross-entropy loss term; (ii) a mean-square error term; (iii) a margin loss term; and (iv) a threshold loss term. In some instances, each term of the loss function is weighted by a respective weighting factor. The weighting factors can be tuned as part of hyperaparametric tuning of the intent classifier.

As such, implementing a distance-based logit value involves automatic processes that can be integrated into the chat bot system, as described with respect to FIGS. 1, 2 and 3, wherever a classification of an utterance (e.g., intent, scope, skill, etc.) may be undertaken. Advantageously, models and chat bots perform better on utterances using the distance-based logit, at least in part because the models reduce the impact of overconfidence issues arising from the softmax function, and do not suffer from uncertainty drawbacks of n-binary "one-versus-all" classifiers. Moreover, because the processes are applied automatically, the customer or client experiences fewer misdirected inquiries from the chat bot system.

1. Distance-Based Logit Value

In some embodiments, the n-binary "one-versus-all" approach is implemented in the skill bot invocation 415 and/or the intent prediction 420. The distance-based logit describes an approach whereby classification includes determining a logit value by measuring a distance between a representation f(x) of an utterance and a centroid $W_i$ for a given class "i." For example, a function "distance" may be defined, such that logits=−1.0*distance ($w_i$, f(x)), where "distance" may be measured by the Euclidean distance function. In this way, the confidence score, as measured by the probabilities of the classes, may be derived from the logit values by calculating a scaled sigmoid activation of the logit values.

Figure 6:
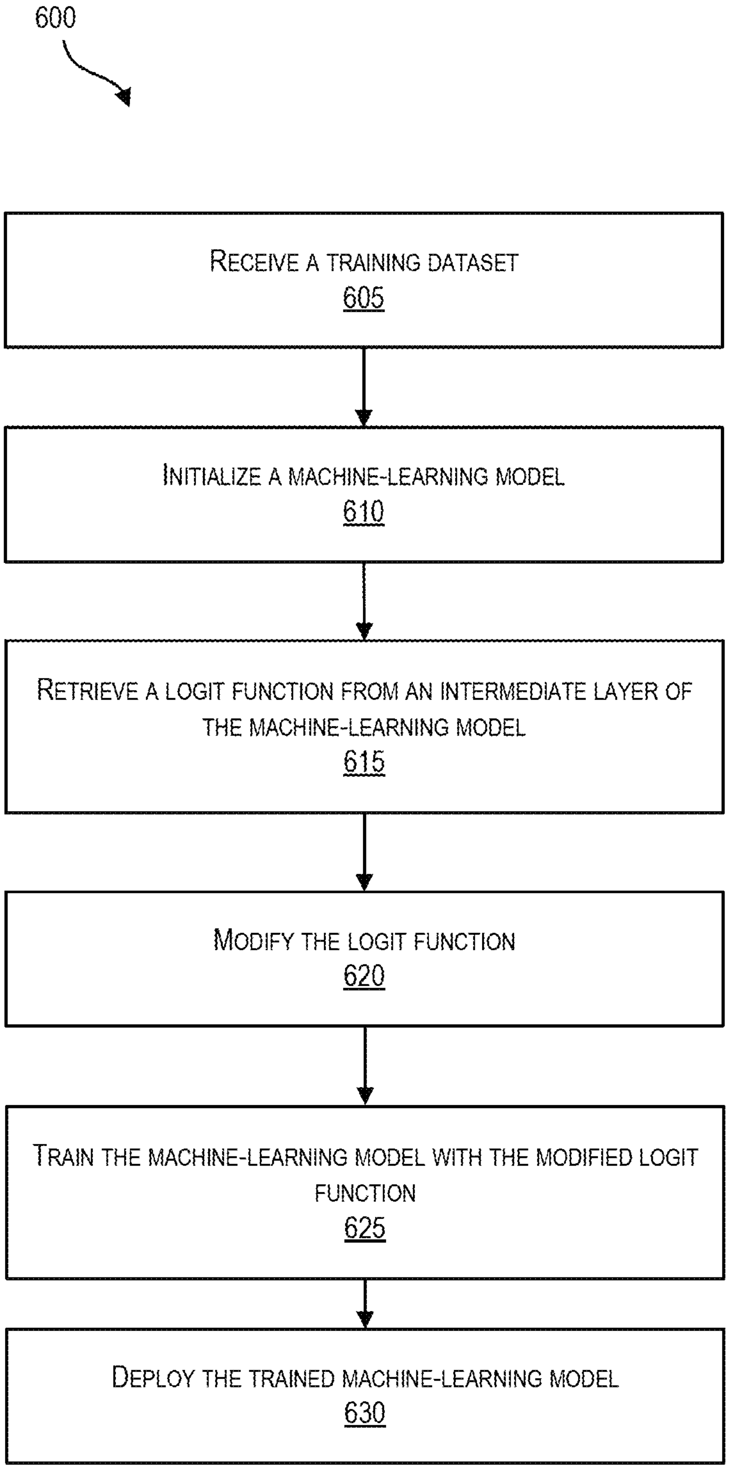
FIG. 6 shows a flowchart illustrating an example process for modifying a logit function to determine a distance-based logit value, according to some embodiments.

FIG. 6 shows a flowchart illustrating an example process 600 for modifying a logit function to determine a distance-based logit value, according to some embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In some embodiments, the steps are performed by a training subsystem to map probability values corresponding to an unresolvable class to distance-based logit values of one or more machine-learning models (e.g., the intent classifier 242 or 320). The training subsystem can be part of a data processing system (e.g., the chatbot system 400 described with respect to FIG. 4) or a component of another system that is configured to train and deploy a machine-learning model.

At 605, the training subsystem receives a training dataset. The training dataset can include a set of utterances or messages. Each utterance of the set is associated with a training label, in which the training label identifies a predicted intent class of the utterance. In some instances, the training dataset is grouped into one or more training sub-datasets, in which each training sub-dataset includes training data (e.g., utterances) that can be used to train a binary classifier of a set of binary classifiers.

At 610, the training subsystem initializes a machine-learning model. The machine-learning model can be a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine-learning model can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network).

In some instances, the machine-learning model is configured to generate a set of outputs, in which each output of the set includes a probability predictive of whether the utterance corresponds to a respective class of the set of classes. The machine-learning model can include a set of binary classifiers. Each binary classifier of the set can generate an intermediate output that includes a value that represents whether the utterance corresponds to a particular class over other classes of the set of classes. The intermediate output can be inputted into a logit function to generate a logit value for the particular class. The logit value can represent odds that the utterance corresponds to a particular class. The logit function is a logarithm of odds for a particular class (e.g., order_pizza intent class, cancel_pizza intent class) and transforms an output of the machine-learning model into a corresponding logit value that fits within a probability distribution. The logit value distribution ranges between (−∞, +∞).

The logit value can be processed through an activation function to generate the probability value for the particular class. The probability value ranges between [0, 1]. The initialization of the machine-learning model can include defining a number of layers, a type of each layer (e.g., fully-connected, convolutional neural network), and a type of an activation function for each layer (e.g., sigmoid).

At 615, the training subsystem retrieves a set of logit functions from a final layer of the machine-learning model. As mentioned above, the intermediate output of a binary classifier can be inputted into a respective logit function of the set to generate a logit value for the particular class. A logit function of the set can thus be a logarithm of odds corresponding to the probability for a class of a set of classes, the logarithm of odds being weighted by a centroid of a distribution associated with the class. Further, each logit function of the set can be associated with a binary classifier of the set of binary classifiers of the machine-learning model. To retrieve the set of logit functions, the training system can select a final layer from a set of layers in a fully-connected neural network. The set of logit functions of the final layer can then be accessed for modification.

At 620, the training subsystem modifies the set of logit functions. For example, each logit function of the set can be modified to determine, for a given class "i" of the set of classes, a distance between an intermediate output of a binary classifier "f(x)" and a centroid "$W_i$". The modified function can thus be represented by logits=−1.0*distance ($w_i$, f(x)). The distance can include an Euclidean distance or cosine distance between the intermediate output and the centroid for the class.

At 625, the training subsystem processes the training dataset to train the machine-learning model with the modified logit functions. The training of the machine-learning model can include training each binary classifier. The training facilitates the machine-learning model to generate a distance-based logit value that corresponds to a probability that the utterance corresponds to a particular class. The machine-learning model can thus generate a distance-based logit value outputted by each modified logit function of the set of modified logit functions. The training subsystem can train the machine-learning model by training each binary classifier of the set of binary classifiers, in which the values corresponding to the centroid and the intermediate output of the binary classifier are learned based on a training dataset. In some instances, a first training dataset used to train a first binary classifier of the machine-learning model is different from a second training dataset used to train a second binary classifier. An activation function (e.g., a sigmoid function) can be applied to the distance-based logit value outputted by the modified logit function to generate a predicted output, in which the expected output identifies a probability predictive of whether the utterance corresponds to a respective class of the set of classes.

One or more parameters of each binary classifier can then be learned to minimize the total loss between the predicted output generated by the binary classifier and an expected output indicated by a training label of a corresponding utterance. The total loss can be determined by applying a loss function to the predicted output and the expected output. The training of the machine-learning model can be performed until the loss reaches a minimum error threshold.

At 630, the training subsystem deploys the trained machine-learning model to a chatbot system (e.g., as part of a skill bot), in which the trained machine-learning model includes the modified logit function. The process 600 terminates thereafter.

2. Enhanced Activation Function

In some instances, the accuracy of the probability estimation is further improved by implementing an enhanced activation function. The enhanced activation function includes scaling the distance-based logit using a scaling value. The scaling value can be a fixed value that is determined by hyper-parameter tuning; or a learned parameter of the intent classifier, in which a value of the parameter is learned during model training. The scaling value of the enhanced activation function can be learned to impose a minimum margin value between the highest output and the second highest output of the machine-learning model. By incorporating the minimum margin value, the uncertainty problem encountered by conventional n-binary "one-versus-all" classifiers can be reduced.

Figure 7:
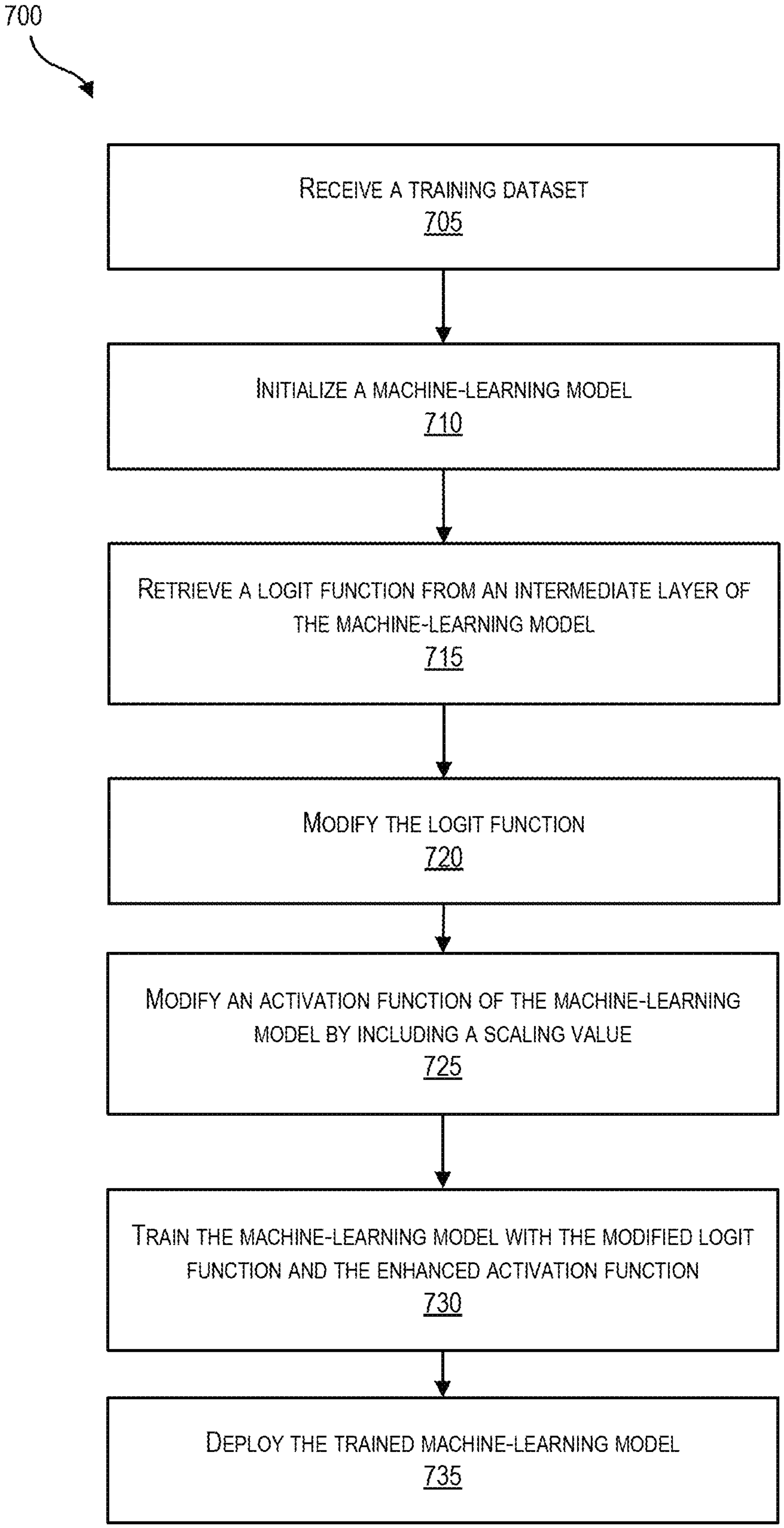
FIG. 7 shows a flowchart illustrating an example process for modifying an activation function to estimate a probability that the utterance corresponds to a particular class, according to some embodiments.

FIG. 7 shows a flowchart illustrating an example process 700 for modifying an activation function to estimate a probability that the utterance corresponds to a particular class, according to some embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In some embodiments, the steps are performed by a training subsystem to map probability values corresponding to an unresolvable class to distance-based logit values of one or more machine-learning models (e.g., the intent classifier 242 or 320). The training subsystem can be part of a data processing system (e.g., the chatbot system 400 described with respect to FIG. 4) or a component of another system that is configured to train and deploy a machine-learning model.

At 705, the training subsystem receives a training dataset. The training dataset can include a set of utterances or messages. Each utterance of the set is associated with a training label, in which the training label identifies a predicted intent class of the utterance. In some instances, the training dataset is grouped into one or more training sub-datasets, in which each training sub-dataset includes training data (e.g., utterances) that can be used to train a binary classifier of a set of binary classifiers.

At 710, the training subsystem initializes a machine-learning model. The machine-learning model can be a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine-learning model can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network).

In some instances, the machine-learning model is configured to generate a set of outputs, in which each output of the set includes a probability predictive of whether the utterance corresponds to a respective class of the set of classes. The machine-learning model can include a set of binary classifiers. Each binary classifier of the set can generate an intermediate output that includes a value that represents whether the utterance corresponds to a particular class over other classes of the set of classes. The intermediate output can be inputted into a logit function to generate a logit value for the particular class. The logit value can represent odds that the utterance corresponds to a particular class. The logit function is a logarithm of odds for a particular class (e.g., order_pizza intent class, cancel_pizza intent class) and transforms an output of the machine-learning model into a corresponding logit value that fits within a probability distribution. The logit value ranges between $(-\infty, +\infty)$.

The logit value can be processed through an activation function to generate the probability value for the particular class. The probability value ranges between [0, 1]. The initialization of the machine-learning model can include defining a number of layers, a type of each layer (e.g., fully-connected, convolutional neural network), and a type of an activation function for each layer (e.g., sigmoid).

At 715, the training subsystem retrieves a set of logit functions from a final layer of the machine-learning model. As mentioned above, the intermediate output of a binary classifier can be inputted into a respective logit function of the set to generate a logit value for the particular class. A logit function of the set can thus be a logarithm of odds corresponding to the probability for a class of a set of classes, the logarithm of odds being weighted by a centroid of a distribution associated with the class. Further, each logit function of the set can be associated with a binary classifier of the set of binary classifiers of the machine-learning model. To retrieve the set of logit functions, the training system can select a final layer from a set of layers in a fully-connected neural network. The set of logit functions of the final layer can then be accessed for modification.

At 720, the training subsystem modifies the set of logit functions. For example, each logit function of the set can be modified to determine, for a given class "i" of the set of classes, a distance between an intermediate output of a binary classifier "f(x)" and a centroid "$W_i$". The modified function can thus be represented by logits=−1.0*distance ($w_i$, f(x)). The distance can include an Euclidean distance or cosine distance between the intermediate output and the centroid for the class.

At 725, the training subsystem modifies an activation function of the machine-learning model by including a scaling value. As mentioned above, the enhanced activation function includes scaling the distance-based logit using a scaling value. The scaling value can be a fixed value that is determined by hyper-parameter tuning; or a learned parameter of the intent classifier, in which a value of the parameter is learned during model training. The enhanced activation function can be represented by confidence_score=distance_scale*sigmoid (−1.0*dist($W_i$, f(x))), in which the confidence_score represents the output of the machine-learning model and corresponds to a probability predictive of whether the utterance corresponds to a respective class of the set of classes. The distance_scale can be a fixed value determined by hyper-parameter tuning; or a trainable model parameter that is automatically determined as part of the training stage 410, as described below.

The probabilities can thus be determined from the enhanced activation function (e.g., a scaled sigmoid function) by normalizing the output between zero and one and by imposing a minimum margin value between the highest output and the second highest output generated by the machine-learning model. For example, the enhanced activation function can be used to impose a minimum difference of 0.1 between the top two class scores. If the difference between the top two scores is less than 0.1, the outputs for the remaining classes can be explicitly reduced 0.1. Then, the difference between the top two scores can be calculated again.

At 730, the training subsystem processes the training dataset to train the machine-learning model with the set of logit functions and the enhanced activation function. The training facilitates the machine-learning model to generate a predicted output that corresponds to a normalized probability that the utterance corresponds to a particular class. The normalized probability can be determined based at least in part on a learned parameter of the enhanced activation function. The training subsystem can train the machine-learning model by training each binary classifier of the set of binary classifiers, in which the values corresponding to the centroid and the intermediate output of the binary classifier are learned based on a training dataset. In some instances, a first training dataset used to train a first binary classifier of the machine-learning model is different from a second training dataset used to train a second binary classifier.

In some instances, the machine-learning model is trained to apply the enhanced activation function to the distance-based logit value outputted by the modified logit function to generate a predicted output. The predicted output corresponds to the probability predictive of whether the utterance corresponds to a respective class of the set of classes. The training subsystem can train the machine-learning model such that the scaling value of enhanced activation function is learned based on the training dataset.

One or more parameters of each binary classifier can then be learned to minimize the total loss between the predicted output generated by the binary classifier and an expected output indicated by a training label of a corresponding utterance. The total loss can be determined by applying a loss function to the predicted output and the expected output. The training of the machine-learning model can be performed until the loss reaches a minimum error threshold.

At 735, the training subsystem deploys the trained machine-learning model to a chatbot system (e.g., as part of a skill bot), in which the trained machine-learning model includes the modified logit function. The process 700 terminates thereafter.

3. Enhanced Loss Function

To further improve the accuracy of the machine-learning models for classifying utterances, a loss function is modified to incorporate additional loss terms, thereby producing an enhanced loss function. The additional loss terms of the enhanced loss function can include one or more of: (i) a binary cross-entropy loss term; (ii) a mean-square error term; (iii) a margin loss term; and (iv) a threshold loss term. In some embodiments, the loss function combines the four losses with different weights, in which each weight can be learned using hyperparameter tuning. The use of enhanced loss function can further facilitate the training the machine-learning model to provide an accurate estimate of its confidence in predicting whether a given utterance corresponds to a particular class.

Figure 8:
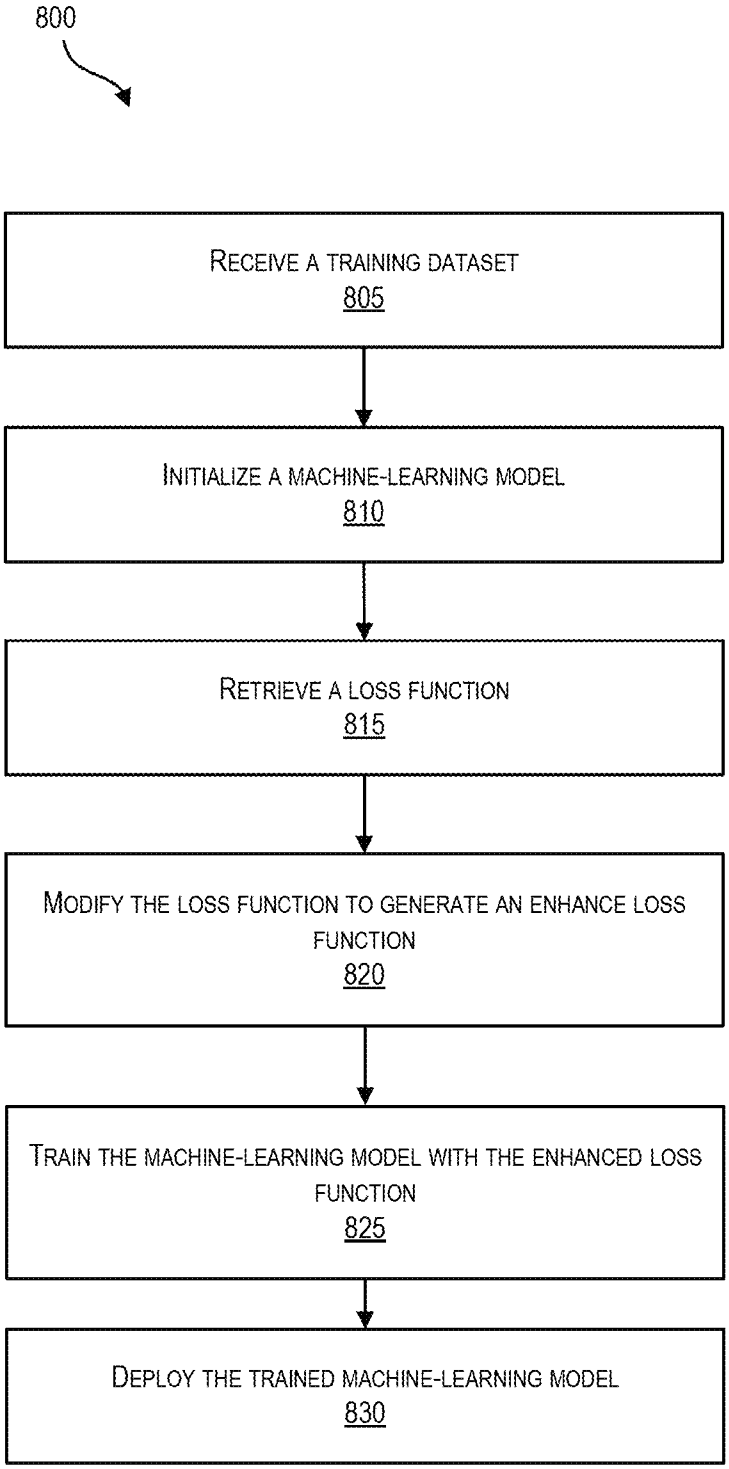
FIG. 8 shows a flowchart illustrating an example process for modifying a loss function to estimate a probability that the utterance corresponds to a particular class, according to some embodiments.

FIG. 8 shows a flowchart illustrating an example process 800 for modifying a loss function to estimate a probability that the utterance corresponds to a particular class, according to some embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In some embodiments, the steps are performed by a training subsystem to map probability values corresponding to an unresolvable class to distance-based logit values of one or more machine-learning models (e.g., the intent classifier 242 or 320). The training subsystem can be part of a data processing system (e.g., the chatbot system 400 described with respect to FIG. 4) or a component of another system that is configured to train and deploy a machine-learning model.

At 805, the training subsystem receives a training dataset. The training dataset can include a set of utterances or messages. Each utterance of the set is associated with a training label, in which the training label identifies a predicted intent class of the utterance. In some instances, the training dataset is grouped into one or more training sub-datasets, in which each training sub-dataset includes training data (e.g., utterances) that can be used to train a binary classifier of a set of binary classifiers.

At 810, the training subsystem initializes a machine-learning model. The machine-learning model can be a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine-learning model can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network).

In some instances, the machine-learning model is configured to generate a set of outputs, in which each output of the set includes a probability predictive of whether the utterance corresponds to a respective class of the set of classes. The machine-learning model can include a set of binary classifiers. Each binary classifier of the set can generate an intermediate output that includes a value that represents whether the utterance corresponds to a particular class over other classes of the set of classes. The intermediate output can be inputted into a logit function to generate a logit value for the particular class. The logit value can represent odds that the utterance corresponds to a particular class. The logit function is a logarithm of odds for a particular class (e.g., order_pizza intent class, cancel_pizza intent class) and transforms an output of the machine-learning model into a corresponding logit value that fits within a probability distribution. The logit value ranges between (−∞, +∞).

The logit value can be processed through an activation function to generate the probability value for the particular class. The probability ranges between [0, 1]. The initialization of the machine-learning model can include defining a number of layers, a type of each layer (e.g., fully-connected, convolutional neural network), and a type of an activation function for each layer (e.g., sigmoid).

At 815, the training subsystem retrieves a loss function of the machine-learning model. For a given utterance in the training dataset, the loss function can be used to determine an error (i.e., a loss) between an output of an activation function of the machine-learning model and a target value indicated in a training label of the utterance. Based on the error, the loss function can express how far off the mark the computed output is, and the error can be used to adjust weights of the parameters of the machine-learning model.

In some instances, the loss function is a binary cross-entropy loss function. Also referred to as sigmoid cross-entropy loss, the binary cross-entropy loss function is defined, for a first class "1" as:

$$CE = -\sum_{i=1}^{C'=2} t_1 \log(f(s_1)) = -t_1 \log(f(s_1)) - (1 - t_1)\log(1 - f(s_1)),$$

for each of C classes (e.g., for a skill bot with three defined classes, C=3) where C independent binary classification problems (C'=2) are defined, where "f(s)" is the sigmoid function, and where "s" is the score and "t" is the ground truth label for the class. In some instances, the cross-entropy loss may be implemented by a one-hot vector approach defining C terms. For example, a cross-entropy loss term may be implemented as "xent_loss"=CE (logits, one_hot_labels), where "CE" is the cross-entropy loss function defined above, and "one_hot_labels" is a vector defining C' for each class (e.g., for C=3, one_hot_labels may equal [1 0 0], [0 1 0], and/or [0 0 1]).

Other types of loss functions can be considered for the machine-learning model to classify the utterance. For example, a loss function can include, but are not limited to, a mean squared error loss function, a mean squared logarithmic error loss function, a mean absolute error loss function, a likelihood loss function, a hinge loss function, a squared hinge loss function, a multi-class cross-entropy loss function, a spare multiclass cross-entropy loss, and a Kullback Leibler divergence loss function.

At 820, the training subsystem modifies the loss function to generate an enhanced loss function. A loss function (e.g., a binary cross-entropy loss function) can be modified to include additional loss terms. The additional loss terms can include one or more of the following:

- A mean square error (MSE). The MSE term can smooth the output of the activation function (e.g., a confidence value). The MSE term can be represented by "mse_loss"=MSE (distance_scale*sigmoid (−1.0*distance (Wi, f(x)), one_hot_labels) where MSE is the mean squared error function;
- A margin loss term. The margin loss term can be used to guarantee the margin between the highest and the second-highest score among the classes. For example, the margin loss term can be represented by "margin_loss"=max (0, M−(top_1_confidence_score−top_2_confidence_score)); and
- A threshold loss term. The threshold loss term can be used to constrain the true label confidence score for in-domain utterances and user-defined out-of-domain utterances to be higher than a first threshold value T1 (e.g., T1=0.7). In addition, the threshold loss term can also be used to constrain the confidence scores for all classes to be lower than a second threshold value T2 (e.g., T2=0.5). The threshold loss term can thus be represented by "threshold_loss"=max (0, T1−true_label_confidence_score)+max (0, top_1_confidence_score−T2).

In some embodiments, the enhanced loss function combines the four losses with their respective weights (Qui). Each of the weights can be tuned during training. For example, the enhanced loss function can be represented by "overall loss"=$\lambda_1$*xent_loss+$\lambda_2$*mse_loss+$\lambda_3$*margin_loss+$\lambda_4$*threshold_loss, in which $\lambda_i$ are tunable parameters for hyperparametric tuning.

At 825, the training subsystem processes the training dataset to train the machine-learning model with the enhanced loss function. In some instances, the training of the machine-learning model includes training each binary classifier of the set of classifiers. The training of the machine-learning model with the enhanced loss function facilitates the machine-learning model to accurately estimate a probability that the utterance corresponds to a particular class. The training can include performing hyperparameter tuning of a weight associated with one of the loss terms of the enhanced loss function. Referring to the above representation in step 820, one or more weights (e.g., $\lambda_1$, $\lambda_2$, $\lambda_3$, $\lambda_4$) of the enhanced loss function can be tuned during the training stage 410, as part of hyperparametric tuning of the classifiers employed for skill bot invocation and/or intent classification.

In some instances, the training subsystem processes the training dataset to train the machine-learning model with the modified logit function, the enhanced activation function, and the enhanced loss function. In addition to the weights of the enhanced loss function, the training subsystem can thus train the machine-learning model by training each binary classifier of the set of binary classifiers, in which the values corresponding to the centroid and the intermediate output of the binary classifier are learned based on a training dataset. In some instances, the machine-learning model is also trained to apply the enhanced activation function to the distance-based logit value outputted by the modified logit function to generate the probability predictive of whether the utterance corresponds to a respective class of the set of classes. The training subsystem can train the machine-learning model such that the scaling value of enhanced activation function is learned based on the training dataset.

One or more parameters of each binary classifier can then be learned to minimize the total loss between the predicted output generated by the binary classifier and an expected output indicated by a training label of a corresponding utterance. The total loss can be determined by applying a loss function to the predicted output and the expected output. The training of the machine-learning model can be performed until the loss reaches a minimum error threshold.

At 830, the training subsystem deploys the trained machine-learning model to a chatbot system (e.g., as part of a skill bot), in which the trained machine-learning model includes the modified logit function. The process 800 terminates thereafter.

4. Experimental Results

As described above, a trained and tuned classifier implementing distance-based logit values may provide improved accuracy and confidence for intent classification. In an illustrative example, for a suite of user-defined skills, implementing the distance-based logit with n-binary classifiers improves the accuracy of the classifier predictions by as much as about 6% or more in aggregate, and may improve accuracy of individual skill bots by as much as about 100% or more. As illustrated in Table 1, below, the performance of skill bots at correctly classifying intent in test data is improved significantly for a majority of cases, and in the aggregate. For example, in-domain accuracy improved by 6% in the example of Table 1, in-domain recall improved by 28%, out of domain precision was unaffected in aggregate, and out of domain recall improved by 8%.

TABLE 1

CLASSIFIER PERFORMANCE ON USER-DEFINED SKILL TEST SETS

| Skill # | isMatch Accuracy | Δ | IND Recall | Δ | OOD Precision | Δ | OOD Recall | Δ |
|---|---|---|---|---|---|---|---|---|
| 1 | 17% | 0% | 100% | 100% | 100% | 0% | 100% | 0% |
| 1 | 97% | −2% | 100% | 100% | 100% | 0% | 100% | 0% |
| 1 | 100% | 0% | 100% | 0% | 100% | 0% | 100% | 0% |
| 2 | 92% | 18% | 100% | 100% | 100% | 0% | 46% | 9% |
| 2 | 55% | 15% | 100% | 100% | 100% | 0% | 54% | 14% |
| 2 | 81% | 2% | 99% | 0% | 100% | 0% | 52% | 15% |
| 2 | 84% | −3% | 99% | −1% | 100% | 0% | 46% | 10% |
| 2 | 93% | −5% | 99% | −1% | 100% | 0% | 31% | 17% |
| 2 | 100% | 0% | 100% | 0% | 100% | 0% | 99% | 1% |
| 2 | 22% | 5% | 100% | 100% | 100% | 0% | 98% | 1% |
| 2 | 94% | −1% | 100% | 0% | 100% | 0% | 99% | 2% |
| 3 | 63% | −7% | 99% | 0% | 100% | 0% | 98% | 22% |
| 3 | 91% | −3% | 99% | 0% | 100% | 0% | 91% | 33% |
| 3 | 66% | 53% | 100% | 0% | 100% | 0% | 97% | 33% |
| 3 | 100% | 100% | 100% | 100% | 100% | 0% | 97% | 38% |
| 3 | 51% | 11% | 100% | 0% | 100% | 0% | 99% | 8% |
| 3 | 8% | 3% | 100% | 100% | 100% | 0% | 98% | 10% |
| 3 | 61% | −7% | 100% | 1% | 100% | 0% | 99% | 8% |
| 3 | 77% | −10% | 100% | 0% | 100% | 0% | 98% | 31% |
| 3 | 100% | 2% | 100% | 100% | 100% | 0% | 99% | 2% |
| 3 | 71% | 71% | 100% | 100% | 100% | 0% | 100% | 27% |
| 3 | 100% | 0% | 100% | 0% | 100% | 0% | 98% | 0% |
| 4 | 82% | 39% | 100% | 100% | 100% | 0% | 86% | 32% |
| 4 | 94% | −1% | 99% | −1% | 100% | 0% | 84% | 33% |
| 5 | 92% | 0% | 100% | 1% | 100% | 0% | 96% | −2% |
| 6 | 95% | 0% | 100% | 0% | 100% | 0% | 58% | −9% |
| 7 | 78% | 0% | 100% | 0% | 100% | 0% | 88% | 1% |
| 7 | 81% | 5% | 100% | 0% | 100% | 0% | 88% | 1% |
| 7 | 80% | −14% | 85% | −14% | 100% | 0% | 88% | 1% |
| 8 | 80% | 60% | 100% | 100% | 100% | 0% | 98% | 2% |
| 8 | 78% | 18% | 100% | 100% | 100% | 0% | 99% | 5% |
| 8 | 96% | 1% | 100% | 0% | 100% | 0% | 99% | 5% |
| 9 | 97% | 6% | 100% | 0% | 100% | 0% | 28% | 18% |
| 9 | 87% | −6% | 93% | −6% | 100% | 0% | 84% | 3% |
| 9 | 97% | 1% | 100% | 0% | 100% | 0% | 32% | 23% |
| 10 | 71% | 0% | 95% | 5% | 100% | 0% | 99% | 2% |
| 10 | 54% | 10% | 100% | 0% | 100% | 0% | 99% | 2% |
| 10 | 95% | −1% | 100% | 0% | 100% | 0% | 99% | 2% |
| 10 | 31% | −20% | 98% | 9% | 100% | 0% | 100% | 2% |
| 10 | 79% | 29% | 100% | 5% | 100% | 0% | 100% | 2% |
| 10 | 59% | −15% | 98% | 0% | 100% | 0% | 100% | 2% |
| 11 | 66% | −1% | 72% | 10% | 100% | 0% | 84% | 6% |
| 11 | 69% | 2% | 98% | −2% | 100% | 0% | 92% | 8% |
| 12 | 86% | - | 100% | — | 100% | — | 100% | — |

TABLE 1-continued

CLASSIFIER PERFORMANCE ON USER-DEFINED SKILL TEST SETS

| Skill # | isMatch Accuracy | Δ | IND Recall | Δ | OOD Precision | Δ | OOD Recall | Δ |
|---|---|---|---|---|---|---|---|---|
| 12 | 0% | 0% | 100% | 100% | 100% | 0% | 100% | 0% |
| 12 | 60% | −20% | 100% | 0% | 100% | 0% | 100% | 0% |
| 12 | 89% | – | 100% | — | 100% | — | 100% | — |
| 12 | 0% | 0% | 100% | 100% | 100% | 0% | 100% | 1% |
| 12 | 62% | −26% | 100% | 0% | 100% | 0% | 100% | 0% |
| 12 | 72% | – | 100% | — | 100% | — | 100% | — |
| 12 | 22% | 5% | 100% | 100% | 100% | 0% | 100% | 1% |
| 12 | 79% | −10% | 100% | 0% | 100% | 0% | 100% | 1% |
| 12 | 74% | −5% | 100% | 0% | 100% | 0% | 99% | 8% |
| 12 | 83% | 0% | 100% | 0% | 100% | 0% | 97% | 13% |
| 12 | 85% | – | 100% | — | 100% | — | 100% | — |
| 12 | 20% | 20% | 100% | 100% | 100% | 0% | 100% | 4% |
| 12 | 50% | −17% | 100% | 0% | 100% | 0% | 100% | 4% |
| 12 | 82% | – | 100% | — | 100% | — | 100% | — |
| 12 | 81% | 58% | 100% | 100% | 100% | 0% | 100% | 1% |
| 12 | 100% | 0% | 100% | 0% | 100% | 0% | 100% | 0% |
| 12 | 68% | — | 100% | — | 100% | — | 100% | — |
| 12 | 58% | 37% | 100% | 100% | 100% | 0% | 100% | 1% |
| 12 | 82% | −7% | 100% | 0% | 100% | 0% | 100% | 1% |
| 12 | 80% | — | 100% | — | 100% | — | 100% | — |
| 12 | 67% | 23% | 100% | 100% | 100% | 0% | 100% | 1% |
| 12 | 50% | −20% | 100% | 0% | 100% | 0% | 100% | 1% |
| 12 | 99% | — | 100% | — | 100% | — | 100% | — |
| 12 | 0% | 0% | 100% | 100% | 100% | 0% | 100% | 1% |
| 12 | 75% | −13% | 100% | 0% | 100% | 0% | 100% | 1% |
| 12 | 76% | — | 100% | — | 100% | — | 99% | — |
| 12 | 89% | 89% | 100% | 100% | 100% | 0% | 100% | 7% |
| 12 | 89% | −6% | 100% | 0% | 100% | 0% | 100% | 7% |
| 12 | 71% | — | 100% | — | 100% | — | 100% | — |
| 12 | 32% | 29% | 100% | 100% | 100% | 0% | 100% | 1% |
| 12 | 81% | 0% | 100% | 0% | 100% | 0% | 100% | 2% |
| 12 | 97% | — | 100% | — | 100% | — | 99% | — |
| 12 | 100% | 0% | 100% | 100% | 100% | 0% | 98% | 0% |
| 12 | 100% | 0% | 100% | 0% | 100% | 0% | 100% | 5% |
| 12 | 100% | — | 100% | — | 100% | — | 100% | — |
| 12 | 80% | 70% | 100% | 100% | 100% | 0% | 100% | 19% |
| 12 | 67% | −16% | 100% | 0% | 100% | 0% | 99% | 17% |
| 13 | 99% | 0% | 100% | 0% | 100% | 0% | 91% | 12% |
| 13 | 100% | 0% | 100% | 0% | 100% | 0% | 91% | 12% |
| 13 | 99% | 0% | 100% | 0% | 100% | 0% | 91% | 12% |
| 13 | 99% | −1% | 100% | 0% | 100% | 0% | 91% | 12% |
| 13 | 93% | −1% | 100% | 0% | 100% | 0% | 91% | 12% |
| 13 | 96% | −4% | 100% | 0% | 100% | 0% | 91% | 12% |
| 13 | 80% | 20% | 100% | 0% | 100% | 0% | 91% | 12% |
| 13 | 6% | 1% | 100% | 100% | 100% | 0% | 91% | 8% |
| 13 | 94% | 0% | 100% | 0% | 100% | 0% | 90% | 11% |
| 14 | 99% | 1% | 100% | 0% | 100% | 0% | 89% | 14% |
| 14 | 100% | 0% | 100% | 0% | 100% | 0% | 89% | 14% |
| 14 | 100% | 0% | 100% | 0% | 100% | 0% | 89% | 14% |
| 14 | 100% | 0% | 100% | 0% | 100% | 0% | 89% | 14% |
| 14 | 94% | 3% | 100% | 0% | 100% | 0% | 89% | 14% |
| 14 | 100% | 0% | 100% | 0% | 100% | 0% | 89% | 14% |
| 14 | 50% | 25% | 100% | 0% | 100% | 0% | 89% | 14% |
| 14 | 99% | 1% | 100% | 0% | 100% | 0% | 89% | 14% |
| 14 | 96% | −1% | 100% | 0% | 100% | 0% | 89% | 14% |
| 14 | 94% | −1% | 100% | 0% | 100% | 0% | 91% | 12% |
| 14 | 0% | 0% | 100% | 100% | 100% | 0% | 100% | 0% |
| 14 | 88% | 3% | 100% | 100% | 100% | 0% | 100% | 0% |
| 14 | 97% | 3% | 100% | 0% | 100% | 0% | 100% | 0% |
| 15 | 70% | −1% | 96% | −1% | 100% | 0% | 79% | 15% |
| 15 | 90% | −7% | 100% | 0% | 100% | 0% | 79% | 15% |
| 15 | 87% | 2% | 100% | 0% | 100% | 0% | 79% | 21% |
| 16 | 89% | −2% | 99% | 0% | 100% | 0% | 47% | −9% |
| 17 | 80% | 1% | 100% | 0% | 100% | 0% | 87% | 17% |
| 17 | 91% | −4% | 95% | −4% | 100% | 0% | 87% | 17% |
| 18 | 65% | −4% | 100% | 0% | 100% | 0% | 91% | 46% |
| 19 | 46% | 38% | 100% | 100% | 100% | 0% | 93% | 2% |
| 19 | 100% | 0% | 100% | 0% | 100% | 0% | 95% | 3% |
| 19 | 81% | 15% | 100% | 0% | 100% | 0% | 95% | 5% |
| 19 | 95% | 68% | 100% | 100% | 100% | 0% | 51% | 20% |
| 19 | 59% | 32% | 100% | 100% | 100% | 0% | 56% | 25% |
| 19 | 82% | −8% | 99% | −1% | 100% | 0% | 58% | 26% |
| 19 | 96% | −1% | 100% | 0% | 100% | 0% | 51% | 4% |
| 19 | 98% | 0% | 100% | 0% | 100% | 0% | 28% | −6% |

TABLE 1-continued

CLASSIFIER PERFORMANCE ON USER-DEFINED SKILL TEST SETS

| Skill # | isMatch Accuracy | Δ | IND Recall | Δ | OOD Precision | Δ | OOD Recall | Δ |
|---|---|---|---|---|---|---|---|---|
| 19 | 98% | 30% | 100% | 0% | 100% | 0% | 100% | 3% |
| 19 | 0% | 0% | 100% | 100% | 100% | 0% | 100% | 3% |
| 19 | 90% | 0% | 100% | 0% | 100% | 0% | 100% | 3% |
| 20 | 71% | 21% | 100% | 0% | 100% | 0% | 97% | 10% |
| 21 | 77% | 1% | 100% | 100% | 100% | 0% | 99% | 2% |
| 21 | 100% | 0% | 100% | 0% | 100% | 0% | 99% | 2% |
| 21 | 98% | 0% | 100% | 0% | 100% | 0% | 99% | 2% |
| 21 | 92% | −2% | 100% | 100% | 100% | 0% | 100% | 0% |
| 21 | 100% | 0% | 100% | 0% | 100% | 0% | 100% | 0% |
| 21 | 100% | 0% | 100% | 0% | 100% | 0% | 100% | 0% |
| 22 | 0% | 0% | 100% | 100% | 100% | 0% | 98% | 2% |
| 23 | 91% | −5% | 100% | 0% | 100% | 0% | 100% | 0% |
| 24 | 89% | 3% | 100% | 0% | 100% | 0% | 100% | 4% |
| 25 | 82% | −3% | 99% | 0% | 100% | 0% | 84% | 19% |
| 25 | 87% | −1% | 100% | 0% | 100% | 0% | 84% | 19% |
| 25 | 93% | −1% | 98% | −2% | 100% | 0% | 84% | 19% |
| 26 | 65% | 12% | 100% | 100% | 100% | 0% | 92% | 3% |
| 26 | 72% | 2% | 100% | 0% | 100% | 0% | 92% | 3% |
| 26 | 53% | −9% | 76% | −22% | 99% | 1% | 92% | 3% |
| 26 | 65% | 5% | 100% | 3% | 100% | 0% | 92% | 3% |
| 26 | 66% | −7% | 100% | 4% | 100% | 0% | 92% | 3% |
| 26 | 71% | 0% | 100% | 1% | 100% | 0% | 92% | 3% |
| 26 | 63% | −3% | 98% | 7% | 100% | 0% | 92% | 3% |
| 26 | 91% | −9% | 100% | 0% | 100% | 0% | 92% | 3% |
| 26 | 84% | 5% | 100% | 3% | 100% | 0% | 92% | 3% |
| 26 | 50% | 5% | 100% | 100% | 100% | 0% | 92% | 1% |
| 26 | 97% | 0% | 100% | 0% | 100% | 0% | 94% | 5% |
| 27 | 27% | 27% | 100% | 100% | 100% | 0% | 83% | 7% |
| 27 | 99% | 1% | 100% | 100% | 100% | 0% | 82% | 12% |
| 27 | 93% | −3% | 97% | −1% | 100% | 0% | 82% | 12% |
| Averages | 76% | 6% | 99% | 28% | 100% | 0% | 90% | 8% |

Figure 9:
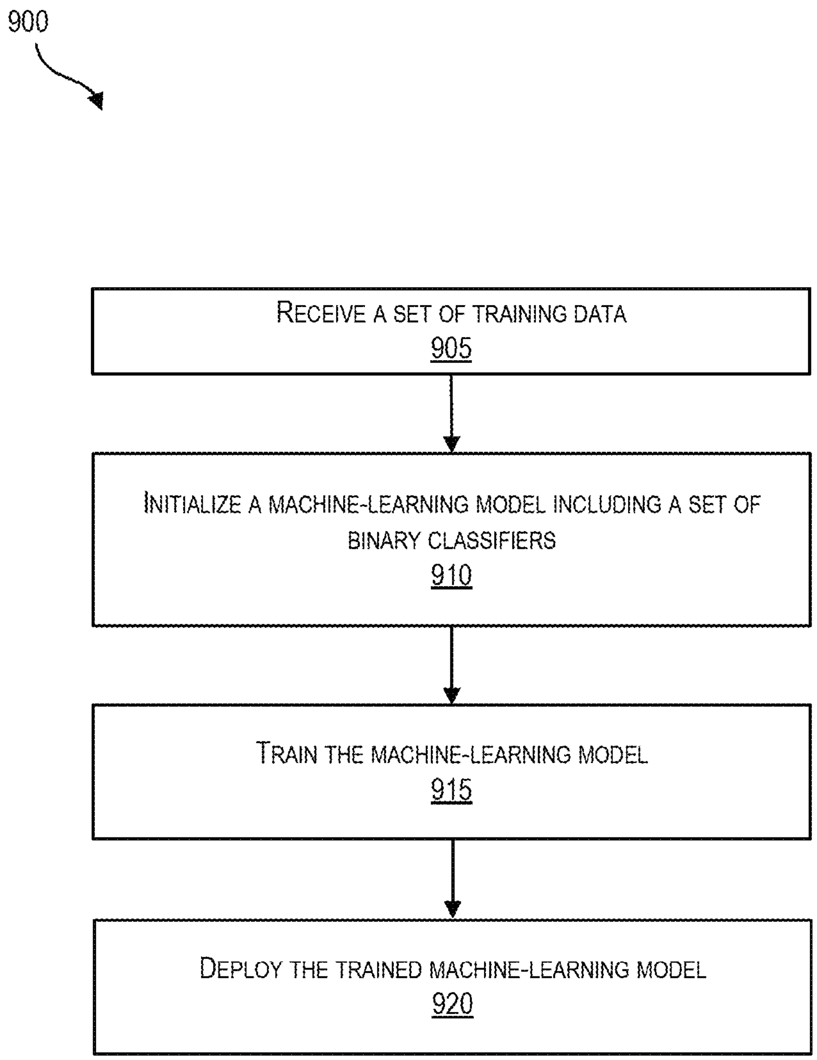
FIG. 9 is a flowchart illustrating a process for training a machine-learning model that uses distance-based logit values to classify utterances, according to some embodiments.

E. Process for Training a Machine-Learning Model Implementing Distance-Based Logit Values for Utterance Classification FIG. 9 is a flowchart illustrating a process 900 for training a machine-learning model that uses distance-based logit values to classify utterances, according to some embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 9 may be performed by a sub-system of a chatbot system (e.g., skill bot invocation 415 or intent prediction 420 of FIG. 4) to classify an utterance into a user-defined class.

At 905, the training subsystem receives a training dataset. The training dataset can include a set of utterances or messages. Each utterance of the set is associated with a training label, in which the training label identifies a predicted intent class of the utterance. In some instances, the training dataset is grouped into one or more training sub-datasets, in which each training sub-dataset includes training data (e.g., utterances) that can be used to train a binary classifier of a set of binary classifiers.

At 910, the training subsystem initializes a machine-learning model. The machine-learning model can include a set of binary classifiers. For example, the machine-learning model may implement an n-binary "one-vs-all" classifier, in which "n" is the number of classes "C." Each binary classifier of the set of binary classifiers: (i) is configured to estimate a probability that the utterance corresponds to a class of the set of classes; (ii) is associated with a modified logit function that transforms the probability for the class into a real number. The modified logit function is a logarithm of odds corresponding to the probability for the class, and the logarithm of odds is determined based on a distance measured between the probability for the class and a centroid of a distribution associated with the class. In some instances, the distance measured between the probability for the class and the centroid of the distribution associated with the class is one of an Euclidean distance or a cosine distance.

The machine-learning model can be a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine-learning model 425 can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network).

The initialization of the machine-learning model can include defining a number of layers, a type of each layer (e.g., fully-connected, convolutional neural network), and a type of an activation function for each layer (e.g., sigmoid, ReLU, softmax).

At 915, the training subsystem trains the machine-learning model using the training dataset to predict whether an utterance or message is representative of a task that a skill bot is configured to perform or to match an utterance or message to an intent associated with a skill bot. The training of the machine-learning model includes training the set of binary classifiers of the machine-learning model with the training dataset. For example, each binary classifier of the set of binary classifiers can be trained by determining a respective probability that an utterance of the training dataset corresponds to a class associated with the binary classifier. The training of each binary classifier can further include mapping, based on the modified logit function, the respective probability for the class associated with the binary classifier to a distance-based logit value. In some instances, the mapping includes using a respective distance measured between the respective probability and a centroid of a distribution associated with the class associated with the binary classifier.

The training of each binary classifier can further include applying an enhanced activation function to the distance-based logit value to generate a predicted output for the class. The predicted output can identify a normalized probability predictive of whether the utterance corresponds to the class within a probability distribution. The enhanced activation function can include a learned parameter for normalizing an initial output of the enhanced activation function to determine the normalized probability. The training of each binary classifier can further include applying an enhanced loss function to the predicted output and an expected output of the utterance to determine a total loss. The enhanced loss function can include a set of loss terms for determining the total loss, and the set of loss terms can include: (i) a binary cross-entropy loss term; (ii) a mean-square error term; (iii) a margin loss term; and (iv) a threshold loss term. The training of each binary classifier can further include adjusting one or more parameters of the binary classifier. In some instances, the one or more parameters include the learned parameter of the enhanced activation function.

One or more parameters of each binary classifier can thus be learned to minimize the total loss between a predicted output generated by the binary classifier and an expected output indicated by a training label of a corresponding utterance. The training of the machine-learning model can be performed until the loss reaches a minimum error threshold.

At 920, the trained machine-learning model may be deployed within a chatbot system (e.g., as part of a skill bot) to predict whether an utterance or message is representative of a task that a skill bot is configured to perform or to match an utterance or message to an intent associated with a skill bot, or predict whether the utterance or message corresponds to an unresolvable class. Process 900 terminates thereafter.

F. Process for Classifying Utterances Using Distanced-Based Logit Value

Figure 10:
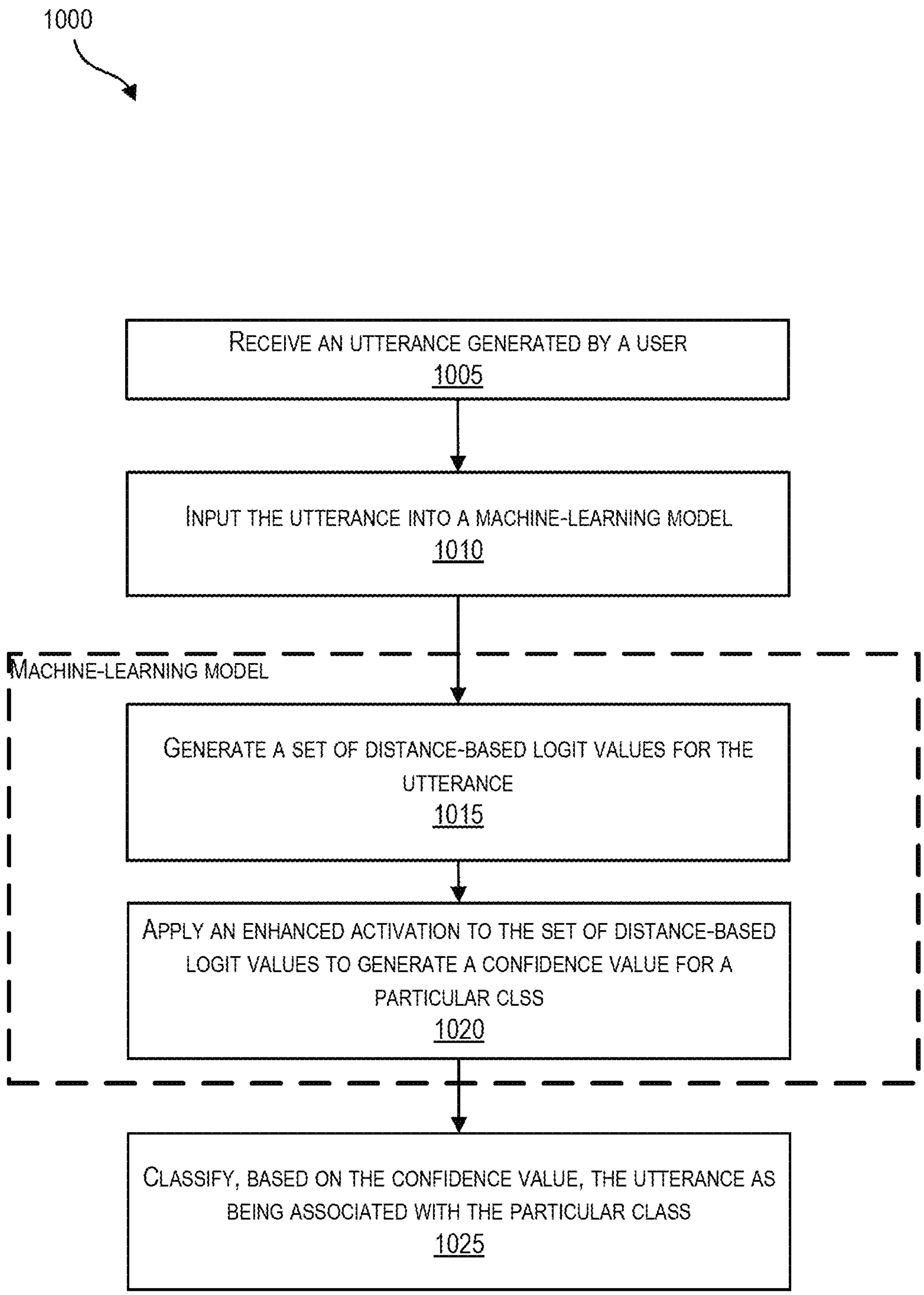
FIG. 10 is a flowchart illustrating a process for classifying intent of an utterance or message using distance-based logit values, according to some embodiments.

FIG. 10 is a flowchart illustrating a process 1000 for classifying intent of an utterance or message using distance-based logit values, according to some embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 10 may be performed by a sub-system of a chatbot system (e.g., skill bot invocation 415 or intent prediction 420 of FIG. 4) to classify an utterance into a user-defined class.

At 1005, the chatbot system receives an utterance generated by a user interacting with the chatbot system. The utterance may refer to a set of words (e.g., one or more sentences) exchanged during a conversation with a chatbot.

At 1010, the chatbot system inputs the utterance into a machine-learning model. The machine-learning model can include a set of binary classifiers. Each binary classifier of the set of binary classifiers: (i) is configured to estimate a probability that the utterance corresponds to a class of the set of classes; (ii) is associated with a modified logit function that transforms the probability for the class into a real number. The modified logit function is a logarithm of odds corresponding to the probability for the class, and the logarithm of odds is determined based on a distance measured between the probability for the class and a centroid of a distribution associated with the class. In some instances, the distance measured between the probability for the class and the centroid of the distribution associated with the class is one of an Euclidean distance or a cosine distance.

The machine-learning model can perform operations 1015 and 1020, so as to generate a predicted output predictive of whether the utterance corresponds to a particular class. At 1015, the machine-learning model generates a set of distance-based logit values for the utterance. Each distance-based logit value of the set of distance-based logit values is generated by: (i) determining, by a respective binary classifier of the set of binary classifiers, a respective probability that the utterance corresponds to a class associated with the respective binary classifier; and (ii) mapping, by the respective binary classifier and based on the modified logit function, the respective probability to the distance-based logit value. The mapping includes using a respective distance measured between the respective probability and a centroid of a distribution associated with the class associated with the respective binary classifier.

At 1020, the machine-learning model applies an enhanced activation function to the set of distance-based logit values to generate a predicted output. The predicted output can identify a normalized probability predictive of whether the utterance corresponds to a particular class of the set of classes within a probability distribution. In some instances, the enhanced activation function includes a learned parameter for normalizing an initial output of the enhanced activation function to determine the normalized probability.

For example, the enhanced activation function can be represented by confidence_score=distance_scale*sigmoid (−1.0*dist ($W_i$, f(x))), in which the confidence_score represents the output of the machine-learning model and corresponds to a normalized probability predictive of whether the utterance corresponds to the particular class. The distance_scale is a learned parameter for normalizing the output of the enhanced activation function.

At 1025, the chatbot system classifies, based on the predicted output, the utterance as being associated with the particular class. Process 1000 terminates thereafter.

G. Illustrative Systems

Figure 11:
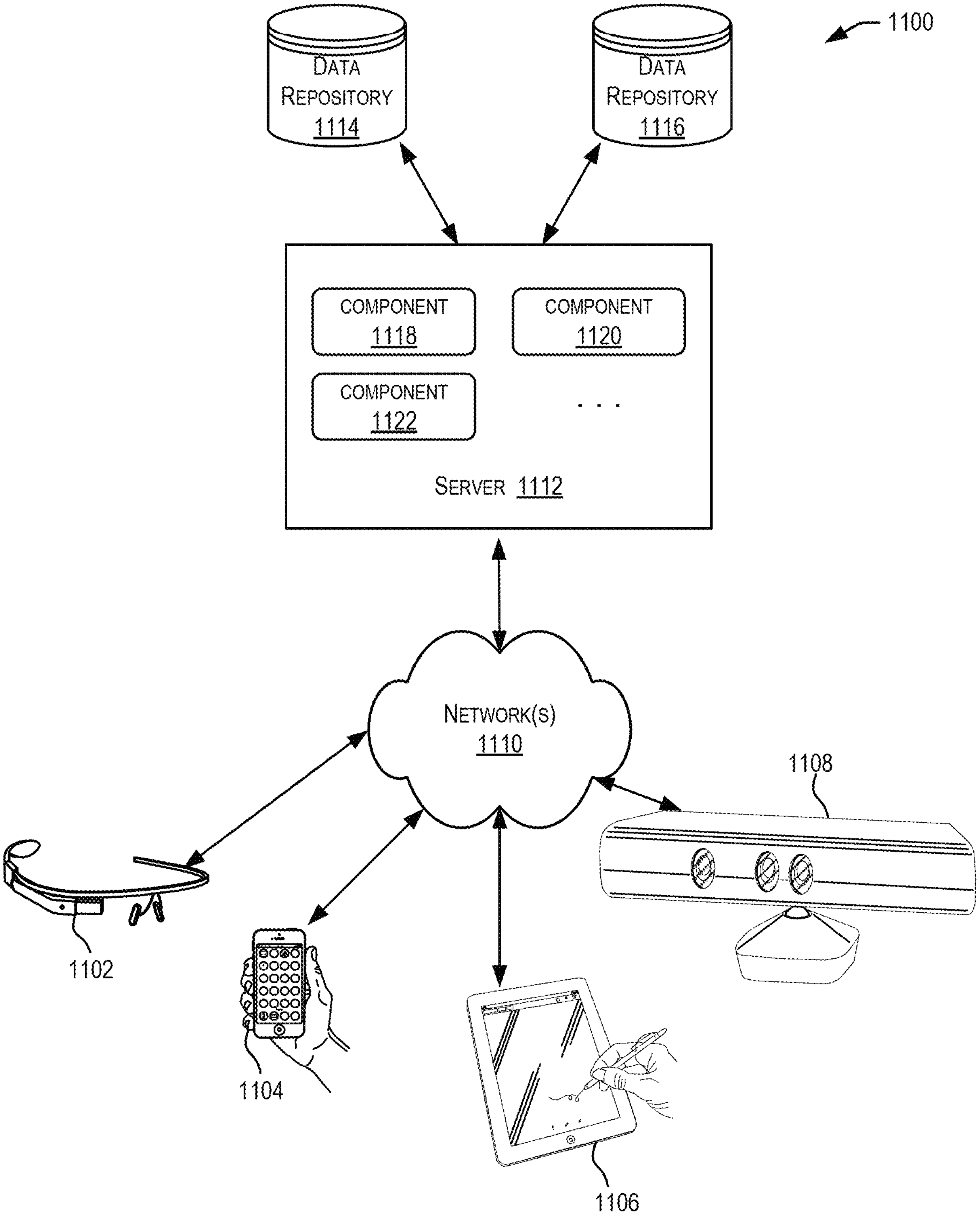
FIG. 11 depicts a simplified diagram of a distributed system for implementing various embodiments.

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples.

For example, one or more of the data repositories 1114, 1116 may be used to store information such as information related to chatbot performance or generated models for use by chatbots used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
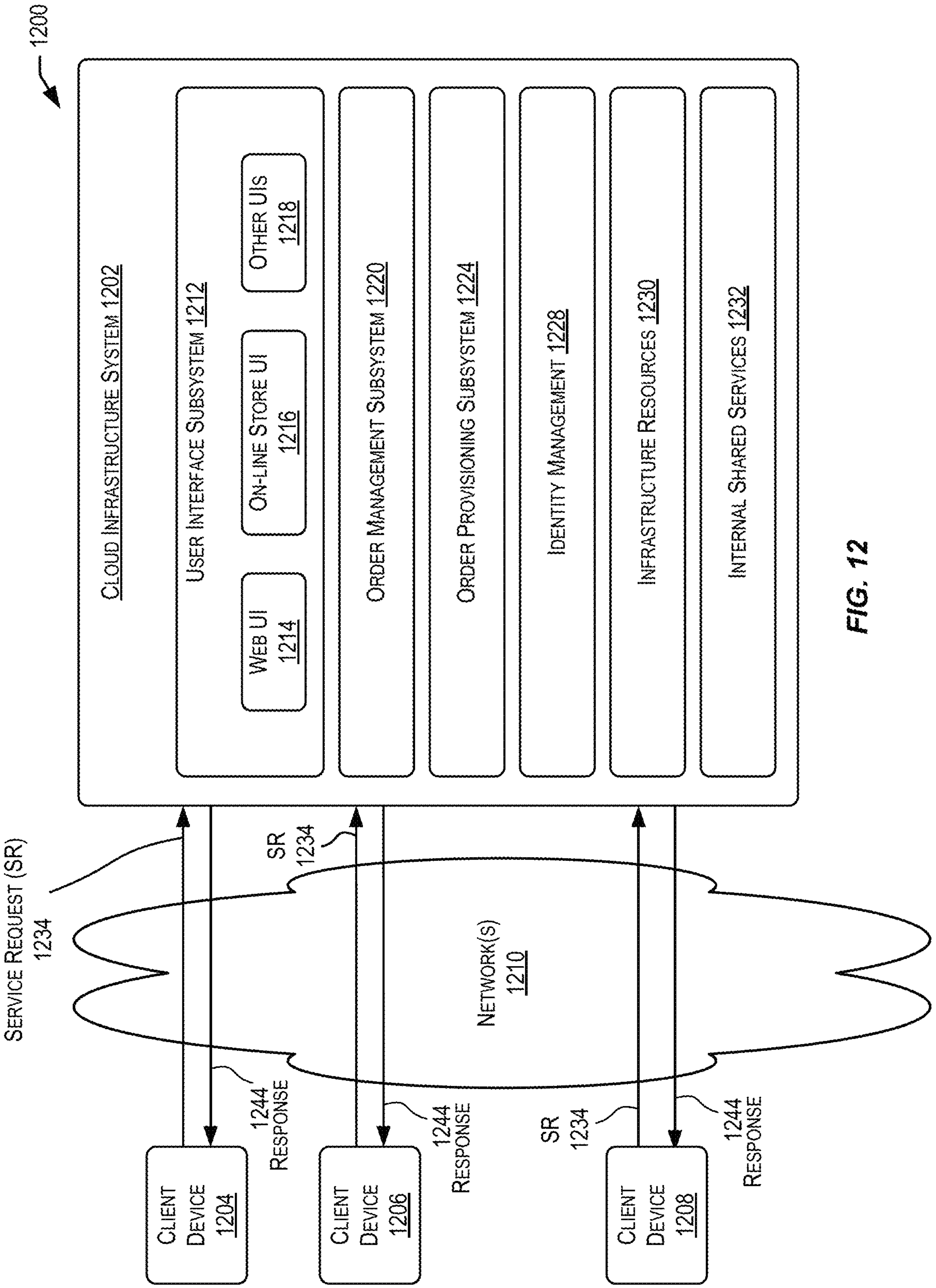
FIG. 12 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may comprise one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a chatbot as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1202 may comprise multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a chatbot system for which the service is to be provided and optionally one or more credentials for the chatbot system.

In certain examples, such as the example depicted in FIG. 12, cloud infrastructure system 1202 may comprise an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1202 and information identifying a chatbot system selected by cloud infrastructure system 1202 for the chatbot system corresponding to the chatbot system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 comprises an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
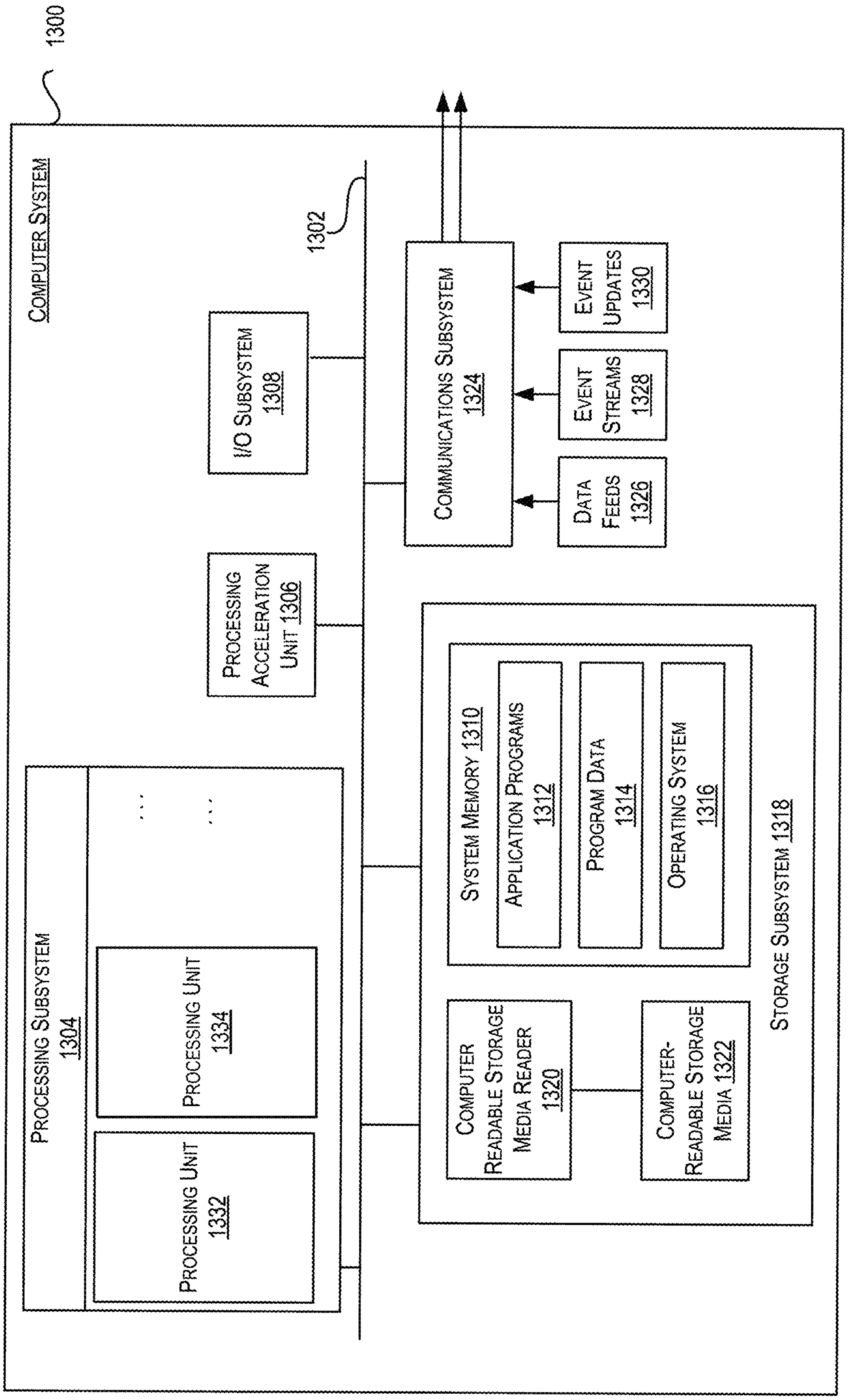
FIG. 13 illustrates an example computer system that may be used to implement various embodiments.

FIG. 13 illustrates an example of computer system 1300. In some examples, computer system 1300 may be used to implement any of the digital assistant or chatbot systems within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may comprise one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. Reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. For example, when computer system 1300 is used to implement bot system 120 depicted in FIG. 1, the communication subsystem may be used to communicate with a chatbot system selected for an application.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:

receiving a training dataset;

initializing a machine-learning model comprising a set of classifiers, wherein the set of classifiers is configured to generate a set of intermediate output values;

retrieving a set of logit functions from the machine-learning model, wherein the set of logit functions is configured to generate a set of logit values based on the set of intermediate output values;

modifying the set of logit functions to generate a set of modified logit functions for the machine-learning model, wherein each modified logit function of the set of modified logit functions is configured to determine a distance between an intermediate output value of the set of intermediate output values and a centroid for a class of a set of classes;

generating a trained machine-learning model by processing the training dataset with the set of modified logit functions; and deploying the trained machine-learning model to a chatbot system.

2. The computer-implemented method of claim 1, wherein each classifier of the set of classifiers is: (i) a binary classifier that is configured to generate an intermediate output value of the set of intermediate output values; and (ii) associated with a modified logit function of the set of modified logit functions.

3. The computer-implemented method of claim 1, wherein each modified logit function of the set of modified logit functions comprises: (i) a logarithm of odds for a particular class of the set of classes; and (ii) transforms an output of the trained machine-learning model into a corresponding logit value that fits within a probability distribution.

4. The computer-implemented method of claim 1, wherein generating the trained machine-learning model comprises training the set of classifiers.

5. The computer-implemented method of claim 4, wherein training the set of classifiers comprises training each classifier of the set of classifiers to generate an intermediate output value of the set of intermediate output values and a centroid based on the training dataset.

6. The computer-implemented method of claim 1, further comprising:

modifying an activation function of the machine-learning model by adding a scaling value to the activation function, wherein the scaling value is configured to modify a logit value generated by a modified logit function of the set of modified logit functions.

7. The computer-implemented method of claim 1, further comprising:

retrieving a loss function of the machine-learning model, wherein the loss function includes a loss term; and modifying the loss function to generate an enhanced loss function, wherein the enhanced loss function includes the loss term and an additional loss term, wherein generating the trained machine-learning model comprises processing the training dataset with the enhanced loss function.

8. A system comprising:

one or more processors; and a computer readable storage medium storing instructions that, when executed on the one or more processors, cause the system to perform operations comprising:

receiving a training dataset;

initializing a machine-learning model comprising a set of classifiers, wherein the set of classifiers is configured to generate a set of intermediate output values;

retrieving a set of logit functions from the machine-learning model, wherein the set of logit functions is configured to generate a set of logit values based on the set of intermediate output values;

modifying the set of logit functions to generate a set of modified logit functions for the machine-learning model, wherein each modified logit function of the set of modified logit functions is configured to determine a distance between an intermediate output value of the set of intermediate output values and a centroid for a class of a set of classes;

generating a trained machine-learning model by processing the training dataset with the set of modified logit functions; and deploying the trained machine-learning model to a chatbot system.

9. The system of claim 8, wherein each classifier of the set of classifiers is: (i) a binary classifier that is configured to generate an intermediate output value of the set of intermediate output values; and (ii) associated with a modified logit function of the set of modified logit functions.

10. The system of claim 8, wherein each modified logit function of the set of modified logit functions comprises: (i) a logarithm of odds for a particular class of the set of classes; and (ii) transforms an output of the trained machine-learning model into a corresponding logit value that fits within a probability distribution.

11. The system of claim 8, wherein generating the trained machine-learning model comprises training the set of classifiers.

12. The system of claim 11, wherein training the set of classifiers comprises training each classifier of the set of classifiers to generate an intermediate output value of the set of intermediate output values and a centroid based on the training dataset.

13. The system of claim 8, the operations further comprising:

modifying an activation function of the machine-learning model by adding a scaling value to the activation function, wherein the scaling value is configured to modify a logit value generated by a modified logit function of the set of modified logit functions.

14. The system of claim 8, the operations further comprising:

retrieving a loss function of the machine-learning model, wherein the loss function includes a loss term; and modifying the loss function to generate an enhanced loss function, wherein the enhanced loss function includes the loss term and an additional loss term, wherein generating the trained machine-learning model comprises processing the training dataset with the enhanced loss function.

15. A computer-program product tangibly embodied in a non-transitory machine-readable storage medium, including instructions configured to cause one or more processors to perform operations comprising:

receiving a training dataset;

initializing a machine-learning model comprising a set of classifiers, wherein the set of classifiers is configured to generate a set of intermediate output values;

retrieving a set of logit functions from the machine-learning model, wherein the set of logit functions is configured to generate a set of logit values based on the set of intermediate output values;

modifying the set of logit functions to generate a set of modified logit functions for the machine-learning model, wherein each modified logit function of the set of modified logit functions is configured to determine a distance between an intermediate output value of the set of intermediate output values and a centroid for a class of a set of classes;

generating a trained machine-learning model by processing the training dataset with the set of modified logit functions; and deploying the trained machine-learning model to a chatbot system.

16. The computer-program product of claim 15, wherein each classifier of the set of classifiers is: (i) a binary classifier that is configured to generate an intermediate output value of the set of intermediate output values; and (ii) associated with a modified logit function of the set of modified logit functions.

17. The computer-program product of claim 15, wherein each modified logit function of the set of modified logit functions comprises: (i) a logarithm of odds for a particular class of the set of classes; and (ii) transforms an output of the trained machine-learning model into a corresponding logit value that fits within a probability distribution.

18. The computer-program product of claim 15, wherein generating the trained machine-learning model comprises training the set of classifiers.

19. The computer-program product of claim 18, wherein training the set of classifiers comprises training each classifier of the set of classifiers to generate an intermediate output value of the set of intermediate output values and a centroid based on the training dataset.

20. The computer-program product of claim 15, the operations further comprising:

modifying an activation function of the machine-learning model by adding a scaling value to the activation function, wherein the scaling value is configured to modify a logit value generated by a modified logit function of the set of modified logit functions;

retrieving a loss function of the machine-learning model, wherein the loss function includes a loss term; and modifying the loss function to generate an enhanced loss function, wherein the enhanced loss function includes the loss term and an additional loss term, wherein generating the trained machine-learning model comprises processing the training dataset with the enhanced loss function.

* * * * *